(12) United States Patent
Hashimoto et al.

(10) Patent No.: US 7,311,284 B2
(45) Date of Patent: Dec. 25, 2007

(54) COIL FORMING METHOD AND COIL FORMING DEVICE

(75) Inventors: Shingo Hashimoto, Anjo (JP); Tooru Kuroyanagi, Anjo (JP); Tsuyoshi Yamaguchi, Anjo (JP)

(73) Assignee: Aisin AW Co., Ltd. (JP)

( * ) Notice: Subject to any disclaimer, the term of this patent is extended or adjusted under 35 U.S.C. 154(b) by 270 days.

(21) Appl. No.: 10/497,945

(22) PCT Filed: Aug. 8, 2003

(86) PCT No.: PCT/JP03/10145

§ 371 (c)(1),
(2), (4) Date: Jan. 24, 2005

(87) PCT Pub. No.: WO2004/015845

PCT Pub. Date: Feb. 19, 2004

(65) Prior Publication Data

US 2005/0133655 A1    Jun. 23, 2005

(30) Foreign Application Priority Data

Aug. 8, 2002 (JP) ............................. 2002-231978
Apr. 21, 2003 (JP) ............................. 2003-116241

(51) Int. Cl.
*B65H 81/06* (2006.01)

(52) U.S. Cl. ................ 242/437.1; 242/443; 242/445.1; 242/448

(58) Field of Classification Search ............ 242/433.1, 242/433.2, 437.1, 443, 445, 445.1, 448
See application file for complete search history.

(56) References Cited

U.S. PATENT DOCUMENTS

| 3,061,214 | A | * | 10/1962 | Swanson | ............... 156/429 |
| 3,167,853 | A | * | 2/1965 | Farmer | ............... 29/605 |
| 3,259,336 | A | * | 7/1966 | Hibbard | ............... 242/478.2 |
| 6,941,644 | B2 | * | 9/2005 | Shteynberg et al. | ............... 29/605 |

FOREIGN PATENT DOCUMENTS

| JP | 51-138803 | 11/1976 |
| JP | 55-094567 | 7/1980 |
| JP | 55-94567 | 7/1980 |
| JP | 56-012845 | 2/1981 |
| JP | 56-12845 | 2/1981 |
| JP | 58-46850 | 3/1983 |
| JP | 58-046850 | 3/1983 |
| JP | 63-1349 | 1/1988 |
| JP | 63-001349 | 1/1988 |

(Continued)

*Primary Examiner*—Emmanuel M Marcelo
(74) *Attorney, Agent, or Firm*—Bacon & Thomas, PLLC

(57) ABSTRACT

A coil forming apparatus for forming a continuous-pole coil having a plurality of single-pole coils includes a winding jig rotatable around a center swing axis. The winding jig includes: a holder rotatable around a center axis of rotation different from center swing axis; and a plurality of coil bobbins arranged around said holder and mounted for reciprocal movement between advanced and retracted positions relative to the holder. Each individual coil bobbin has a winding axes which can be aligned with the center swing axis by turning the winding jig around the center axis of rotation. The single-pole coils having little twist can be stably formed for any coil bobbin to thereby form the continuous-pole coil.

26 Claims, 34 Drawing Sheets

FOREIGN PATENT DOCUMENTS

| | | |
|---|---|---|
| JP | 03-159542 | 7/1991 |
| JP | 3-159542 | 7/1991 |
| JP | 9-9588 | 1/1997 |
| JP | 09-009588 | 1/1997 |
| JP | 11-178291 | 7/1999 |
| JP | 2000-253631 | 9/2000 |
| JP | 2003-158860 | 5/2003 |

* cited by examiner

COIL FORMING METHOD AND COIL FORMING DEVICE

CROSS-REFERENCE TO RELATED APPLICATIONS

This application is a National Phase Application (35 USC 371) of PCT/JP2003/010145 and claims priority of Japanese Application No. 2002-231978 filed Aug. 8, 2002 and Japanese Application No. 2003-116241 filed Apr. 21, 2003.

INCORPORATION BY REFERENCE

The disclosure of Japanese Patent Application No. 2002-231978 filed Aug. 8, 2002 and Japanese Application No. 2003-116241 filed Apr. 21, 2003 including the specifications, drawings and abstracts are incorporated herein by reference in their entirety.

TECHNICAL FIELD

The present invention relates to an apparatus and a method for forming a coil to be used in a motor (e.g., an electric motor).

BACKGROUND ART

When a motor including a stator having a plurality of single-pole coils inserted in the slots of a stator core is to be manufactured, for example, it is necessary to form a coil as a plurality of continuous single-pole coils.

In the coil forming method of the prior art, a winder is used to form the single-pole coil by winding an electric wire around a stationary bobbin. In order to form another single-pole coil in continuity with the first single-pole coil thus obtained, the winder is turned in the opposite direction around the fixed bobbin, to form a single-pole coil having a reversed winding direction.

A coil forming method similar to the above-described method is disclosed in JP-A-2000-253631, for example. As described in JP-A-2000-253631, the external diameter of the bobbin for winding the electric wire can be changed, and a flyer (serving as the aforementioned winder) is turned around the bobbin. The wound single-pole coils are sequentially formed to produce the continuous-pole coil to be used in the motor.

However, the coil forming method of the prior art thus far described has the following problems. Specifically, the electric wire is fed while the winder is being turned, so that the wire is wound on the bobbin while being twisted by the turning motion of the winder. In the case where the coil is formed with the electric wire twisted, the occupation percentage of the coil is reduced for the reason that the electric wire cannot be individually moved into slots or that a dead space is formed by the twists.

The present invention has been conceived in view of the foregoing problems of the prior art and contemplates provision of a coil forming method and a coil forming apparatus which can form a single-pole coil without twisting the electric wire.

SUMMARY OF THE INVENTION.

The present invention provides a method for forming a motor coil having a plurality of connected single-pole coils wound with loops of an electric wire including:
providing a winding jig having a plurality of bobbins; and
winding one of the bobbins with the electric wire by feeding the electric wire while turning the whole winding jig, either around a winding axis of the bobbin or around a line generally parallel to the winding axis, to thereby form a single-pole coil, and subsequently forming a single-pole coil around each of the remaining bobbins in the manner of winding the first bobbin to thereby form the motor coil.

Unlike the prior art, therefore, the winding is not performed by turning the electric wire itself with a winder. In the present invention, therefore, the winding is performed with little tension in a direction tending to twist the electric wire. Therefore, the single-pole coil can be formed around each bobbin without twisting the electric wire.

The present invention also provides an apparatus for forming a motor coil having a plurality of connected single-pole coils wound with loops of an electric wire, comprising:
a winding jig with a plurality of bobbins; and
a turning device ("turning means") for turning the winding jig as a whole either around the axis of any one of the bobbins for winding or around a line generally parallel to the axis.

In the method of the present invention, it is preferred that the bobbin being wound with the electric wire is extended relative to the remaining bobbins. In this case, the extended (protruding) bobbin can be easily fed with the electric wire in a direction perpendicular to the winding axis thereof. Therefore, it is easy to feed the electric wire and to wind the electric wire around the bobbin, so that the single-pole coil can be more easily formed with little twist.

Moreover, it is preferred that the winding of the electric wire is performed such that the axes of the bobbins for winding the electric wire are sequentially brought close to the center of rotation of the winding jig. Thus, the winding of the electric wire can be performed with the winding bobbin hardly eccentric (offset from) to the turning center. Therefore, the single-pole coil can be more easily formed with little twist.

Moreover, it is preferred that the bobbins are arranged to have their axes offset from each other so that they are not aligned. Thus, the electric wire can be wound by turning the magazine as a whole around the axes of the bobbins offset from each other.

In a preferred embodiment the apparatus includes a winding jig having a base holder and a plurality of bobbins mounted around the outer circumference of the base holder for movement relative to the base holder. Thus, the winding jig has a unique construction including the base holder and the bobbins.

Preferably, the method comprises moving a first of the bobbins to protrude farther than the remaining bobbins; winding the first protruded bobbin with the electric wire to form a single-pole coil by feeding the first bobbin with the electric wire generally in one direction while turning the whole winding jig either around the winding axis of the first bobbin or around an axis generally parallel to the bobbin winding axis; and sequentially repeating the bobbin protruding and winding steps on the other bobbins to form the motor coil.

Because the winding step is performed by turning the whole magazine either around the winding axis of the protruded bobbin or around a line parallel to the winding axis, the electric wire can be fed in one direction, thus making it unnecessary, unlike the prior art, to turn the electric wire itself. Therefore, the single-pole coil can be formed around the bobbin without twisting the electric wire.

Because the bobbin to be wound can be changed by extending that bobbin so that it protrudes beyond the other bobbins, it is unnecessary to prepare any special space for feeding the electric wire between the adjoining bobbins which, in turn, makes it possible to reduce the length of the crossover wire between the single-pole coils. Therefore, it is possible to form the single-pole coil without any twist of the electric wire and to reduce the length of the crossover wire between the single-pole coils.

Protrusion of a bobbin for winding may be by moving the bobbin linearly forward in the axial direction or by swinging the bobbin to where its axis is substantially perpendicular to the axis of another bobbin, whereby it protrudes sideways of the latter bobbin. No special direction or method of protruding a bobbin is required, so long as the electric wire to be fed to the protruded bobbin has no interference with another bobbin when the magazine is turned for winding.

It is preferred that the bobbins be mounted for movement forward and backward, generally linearly along their winding axes so that one bobbin is moved forward in the bobbin extending step to protrude farther than the remaining bobbins. Thus, it is possible to simplify the drive mechanism of the bobbin.

Instead of the aforementioned substantially linear forward and backward movement other various moving methods turning the bobbin or combining the forward or backward movement with a swinging motion can be utilized for extending a bobbin.

It is preferred that in winding the bobbins in sequence, the direction of turning of the magazine is reversed for each bobbin. Thus, the motor coil is formed to have connected single-pole coils with different winding directions.

It is also preferred that the bobbins be arranged such that their centers of gravity are in a generally circular array. In this manner, the individual bobbins can be easily arranged close to each other in the magazine so that the lengths of the crossover wires joining the single-pole coils wound around the bobbins can be easily shortened. Moreover, one of the bobbins for winding the electric wire can be easily brought close to the turning center of the magazine.

It is further preferred that the winding axes of the bobbins extend either radially outward or obliquely outward from the center of the aforementioned generally circular array. In this manner, the winding axis of the bobbin for winding the electric wire can be easily brought into alignment with the turning center of the winding jig by turning the winding jig carrying the bobbins ("indexing").

Alternatively, it is possible to have the axes of the bobbins arranged generally in parallel with each other. In this case, too, the bobbin for winding the electric wire can be easily brought into alignment with the turning center of the winding jig by turning the winding jig carrying the bobbins ("indexing").

Moreover, it is preferred that the base holder has a disc shape and that the bobbins are arranged to move forward and backward along axes extending radially from the center of the base holder. In this case, when the turning axis of the entire winding jig is to be changed, the whole winding jig may be slightly turned (indexed) around the center of the base holder for engagement with the turning device. As a result, it is easy to change the turning center when the bobbin for the winding operation is changed.

It is also preferred that the bobbins have a sector shape which widen along their winding axis. In this case, because the single-pole coil to be formed around the bobbin has its shape widened along the axis thereof, it is easily mounted in the inner circumferential surface of the stator core, for example.

Moreover, it is preferred that each of the bobbins has removably mounted shaping blocks for shaping the single-pole coil to be wound. In this case, the shape of the single-pole coil can be easily changed by employing shaping blocks of different shapes.

The winding jig is preferably formed such that the distal ends of all of the bobbins in their retracted positions define a circle centered on the center point of the base holder. When the coil is to be inserted from the inside of a ring-shaped stator core, the coil can be mounted directly on the stator core without being transferred to another device, by arranging the winding jig holding the formed coil on the inner face side of the stator core. Therefore, the motor coil manufacturing process can be rationalized far better than the prior art.

The apparatus preferably further includes separation plates extending from the outer circumference of the base holder arranged on each side of each of the bobbins, with predetermined spacings between the separation plates and the bobbins. In this case, when the bobbin is retracted after the single-pole coil has been formed around it, the coil can be inserted in the predetermined spacings between the separation plates and the bobbins, so that the coil can be retained on the winding jig while satisfactorily retaining its shape.

BEST MODE FOR CARRYING OUT THE INVENTION

Embodiment 1

A coil forming method and a coil forming apparatus according to an embodiment of the invention will now be described with reference to FIG. 1 to FIG. 17.

Figure 1:
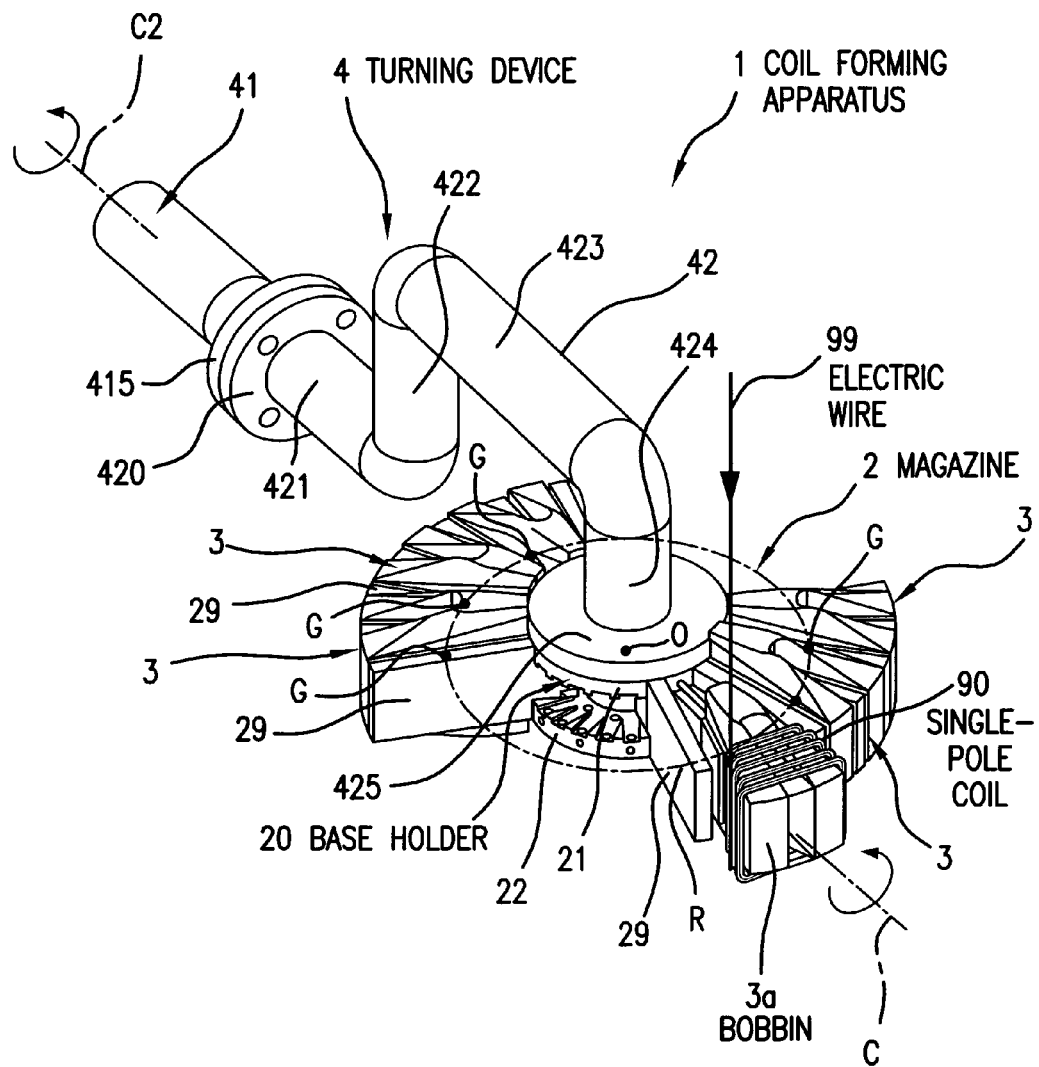
FIG. 1 is a perspective view of a first embodiment of a coil forming apparatus in accordance with the present invention.
Figure 2:
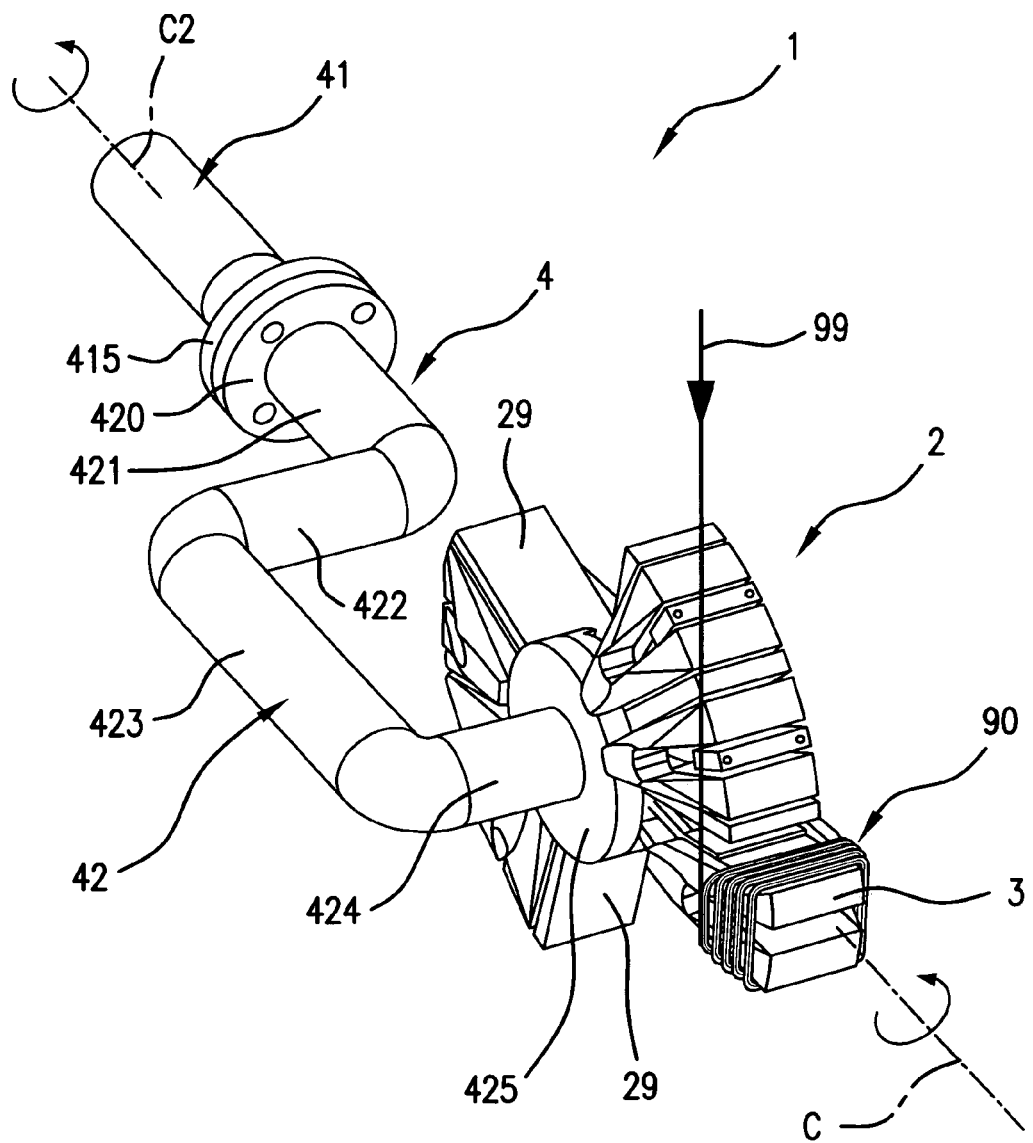
FIG. 2 is a perspective view illustrating a coil being formed by the coil forming apparatus of FIG. 1.

As shown in FIG. 1 and FIG. 2, a coil forming apparatus 1 forms a motor coil 9 (see FIG. 14) composed of three contiguous single-pole coils 90 formed of an electric wire 99 wound into a loop shape. The coil forming apparatus 1 includes a winding jig 2 and a turning device ("rotation means") 4.

Figure 3:
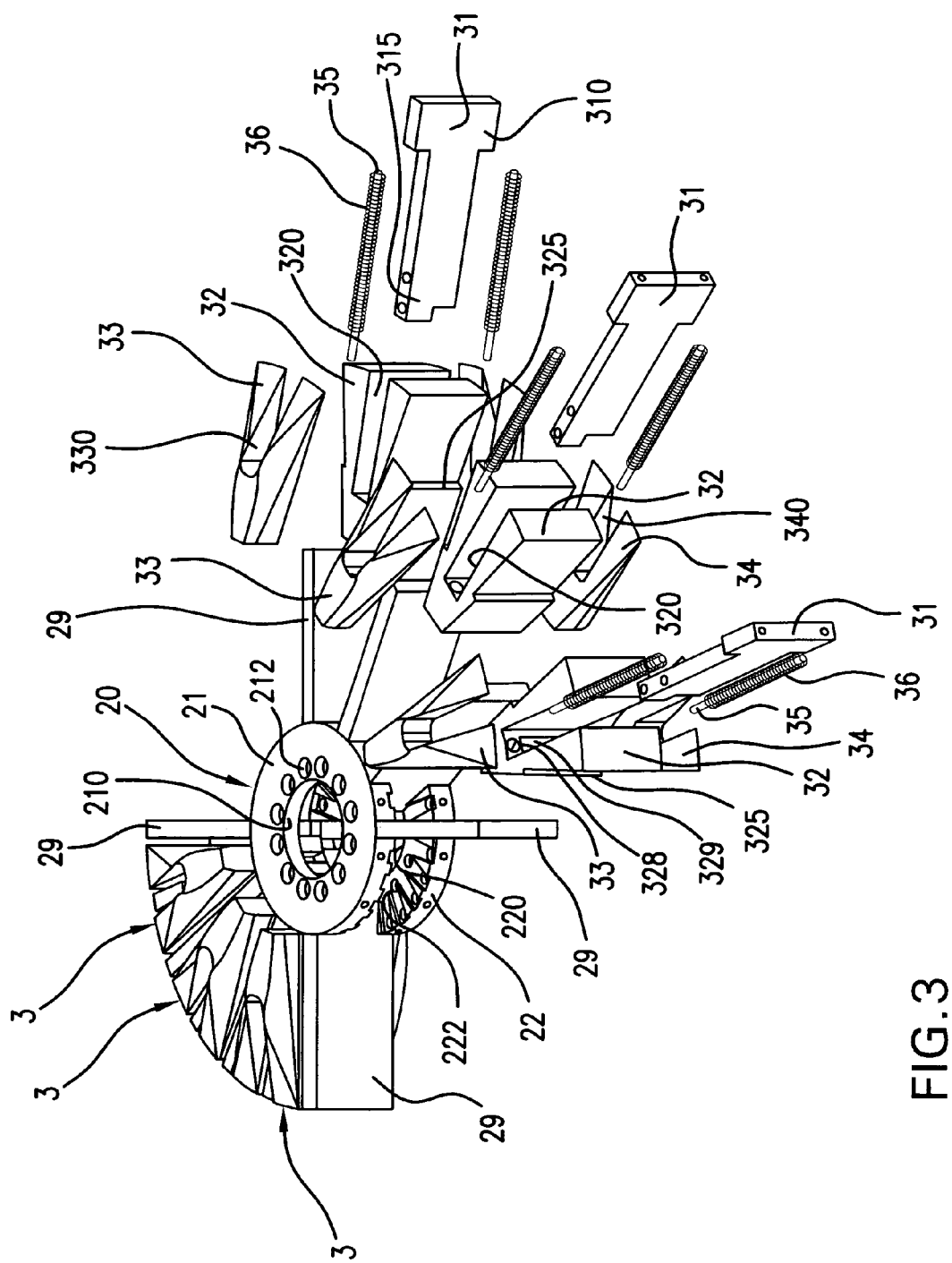
FIG. 3 is an exploded view of the winding jig in FIG. 1.

As shown in FIG. 1 to FIG. 3, the winding jig 2 is provided with a base holder ("indexing means") 20 and a plurality of bobbins 3 arranged on the outer circumference of the base holder 20. These bobbins 3 are arranged to move toward and away from the base holder 20 and are constructed such that any one can be extended farther than the others.

As shown in FIG. 1 and FIG. 2, the turning device 4 is constructed to turn the winding jig 2 as a whole around an axis C for winding in the forward or reverse direction around the extended bobbin 3.

In the winding jig 2, as shown in FIG. 3, the base holder 20 has a disc shape. Specifically, the base holder 20 has a pair of upper and lower ring-shaped plates 21 and 22, which are respectively provided with central through holes 210 and 220 and a plurality of positioning holes 212 and 222 around the through holes. These central through holes 210 and 220 and positioning holes 212 and 222 are provided for positioning the bobbins relative to turning device 4.

The paired upper and lower ring-shaped plates 21 and 22 are connected to each other through separation plates 29, which extend radially from their centers. In this embodiment, four separation plates 29 are arranged at a pitch of 30 degrees, i.e., 30 degrees apart, and other four separation plates 29 are arranged opposite thereof, also at a pitch (angular spacing) of 30 degrees. Moreover, the bobbins 3 are individually arranged in the angular spaces of about 30 degrees, interposed between the adjoining separation plates 29. This embodiment has six bobbins 3 in total, with three adjoining bobbins on each of the opposite positions.

As shown in FIG. 3, the winding jig 2 of this embodiment is so constructed that additional separation plates 29 and bobbins 3 can be arranged at vacant positions on the outer circumference of the disc-shaped base holder 20, up to a maximum of twelve bobbins 3.

As shown in FIG. 3, on the other hand, the bobbins 3 are arranged to move radially forward and backward, along the axes which radially extend from the center point of the base holder 20. Moreover, each bobbin 3 has a sector shape, i.e., widens along the axis.

As shown in FIG. 3, more specifically, each bobbin 3 has a bobbin body 32, which overall has a generally sector shape and a front face and a back face in parallel with the ring-shaped plates 21 and 22 of the base holder 20 and which is provided with a cutout 320 at its central portion. Moreover, the bobbin body 32 is provided on its two side faces with steps 325 for positioning the single-pole coil 90 as this coil 90 is formed.

On the front face and the back face of the bobbin body 32, shaping blocks 33 and 34, for shaping the single-pole coil 90 to be wound, are removably arranged. These shaping blocks 33 and 34 also have a generally sector shape and are provided with cutouts 330 and 340 at their central portions. The shaping blocks 33 and 34 are fixed on the bobbin body 32 by screws.

Moreover, the closer to the inner circumference from the outer circumference, the thicker the shaping blocks 33 and 34 become, as shown in FIG. 3, so that closer to the inner circumference the single-pole coil becomes larger in height.

As shown in FIG. 3, the bobbin body 32 also has a rectangular through hole 329 extending axially from the cutout 320 to the base holder 20. Above and below this through hole 329, moreover, there are formed circular rod through holes 328. A guide plate 31 extends through the through hole 329 into the base holder 20, and the bobbin 3 rides thereon for movement toward or away from the base holder 20.

As shown in FIG. 3, more specifically, the guide plate 31 is provided with a proximal end 315 to be fixed in the base holder 20, and an enlarged distal end 310 forming a generally T-shape for limiting the fore position of the bobbin 3. The proximal end 315 of the guide plate 31 is inserted into the through hole 329, opened in the bottom of the cutout 320 of the bobbin body 32, and rods 35 carrying springs 36 are inserted into the rod holes 328. Then, the distal end 315 of the guide plate 31 is clamped and fixed between the paired upper and lower ring-shaped plates 21 and 22 of the base holder 20, and the two rods 35 are fixed at their inner ends to the ring-shaped plates 21 and 22 and at their outer ends to the distal end 310 of the guide plate 31. As a result, the bobbin 3 can move forward or backward along an axis extending radially from the center point of the base holder 20.

Figure 15:
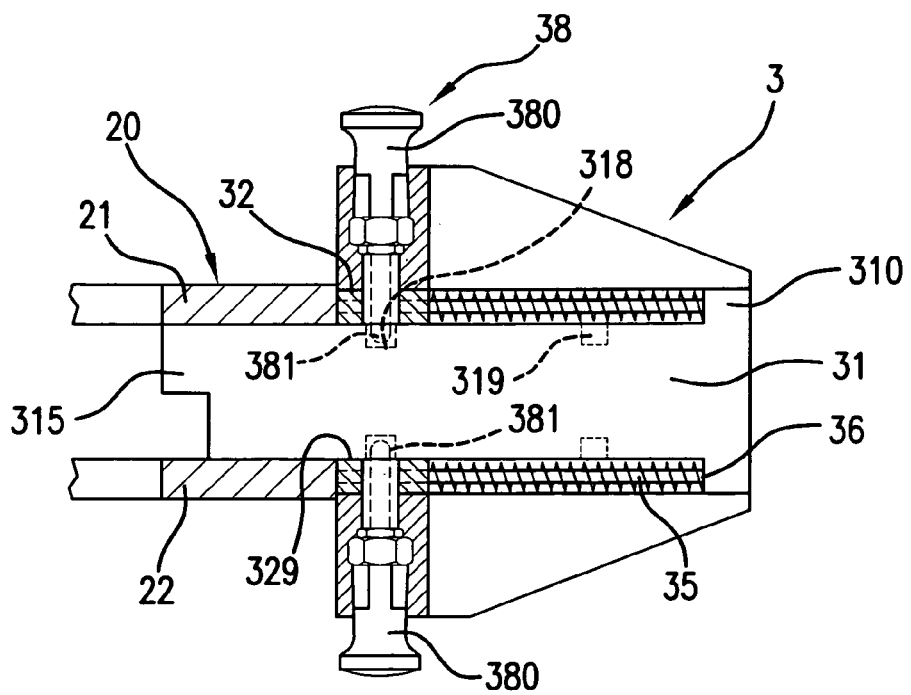
FIG. 15 is a side view, in cross-section of structure in the first embodiment for fixing a bobbin in retracted position.
Figure 16:
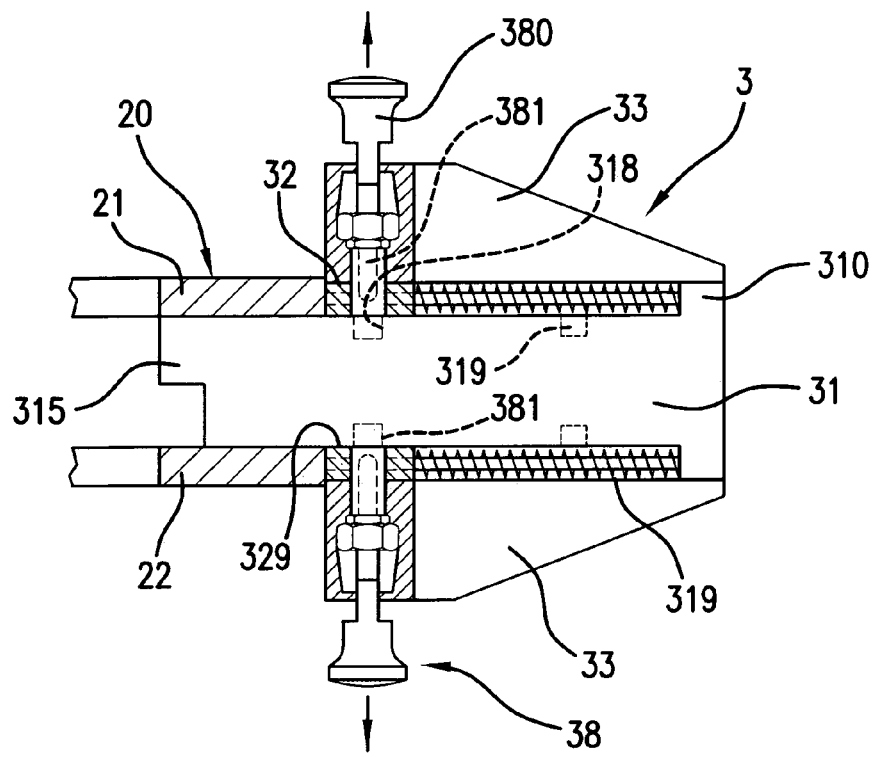
FIG. 16 is a side view similar to FIG. 15 but with the positioning pins of a bobbin disengaged from a guide plate.
Figure 17:
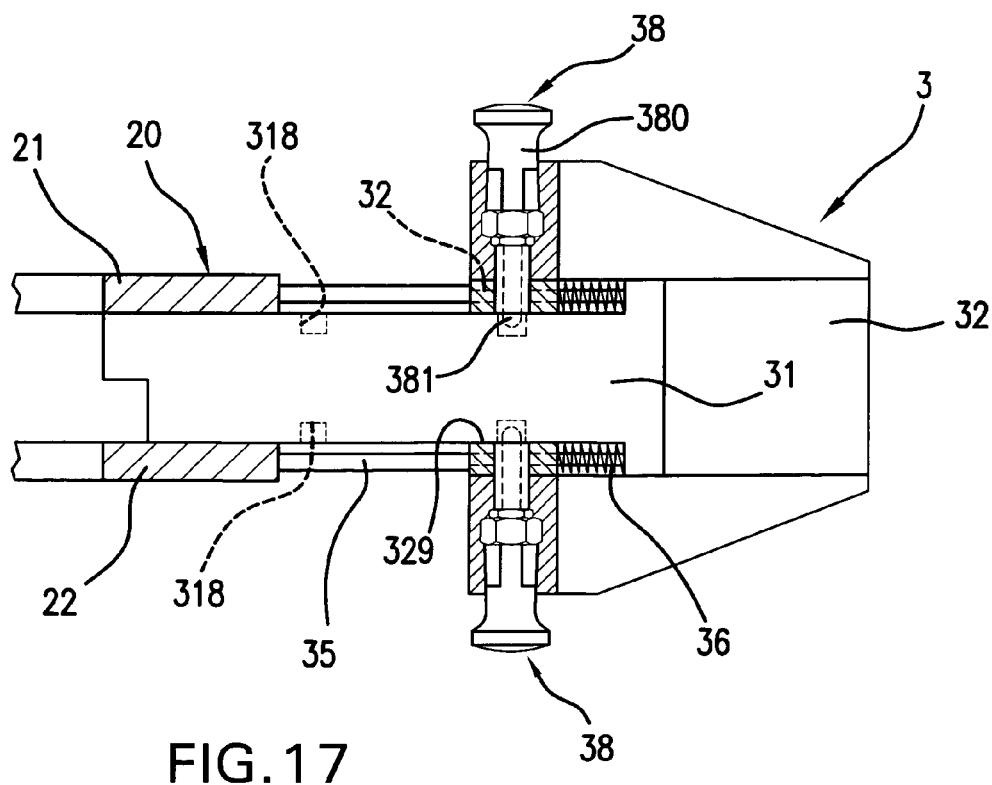
FIG. 17 is a side view similar to FIG. 15 with the bobbin fixed in an extended position.

As shown in FIG. 15 to FIG. 17, the bobbin 3 is provided with upper and lower positioning pins 38 with distal ends 381 movable in and out of pin holes 318 and 319 in the guide plate 31 by pinching pin heads 380. With the pin distal ends 381 of the positioning pins 38 engaged within the pin holes 318, as shown in FIG. 15, the bobbin 3 is held in a position close to the base holder 20. In case the bobbin 3 is to be moved forward, on the other hand, the positioning pins 38 are pulled outward to release the pin distal ends 381 from the pin holes 318 so that the bobbin 3 can be moved forward against the springs 36. As shown in FIG. 17, moreover, the positioning pins 38 are pushed inward again to insert their distal ends 381 into engagement with the pin holes 319. As a result, the bobbin 3 is fixed at a position radially outward from the base holder 20.

On each of opposing sides of the bobbins 3 are arranged the separation plates 29, which extend from the outer circumference of the base holder 20. Moreover, predetermined spacings are provided between the separation plates 29 and the bobbins 3 to function as coil retaining grooves (described later).

In the winding jig 2 of this embodiment, the contour, formed by the distal ends of all the bobbins 3 being moved backward, has a circular shape around the center point of the base holder 20. In other words, the winding jig 2 of this embodiment is shaped such that it can arrange the individual bobbins 3 confronting the inner circumference of a stator core.

The turning device 4 of this embodiment is provided, as shown in FIG. 1 and FIG. 2, with a straight portion 41 extending from a (not-shown) drive shaft, and a flexible joint 42 connected to the straight portion 41 through flanges 415 and 420. The flexible joint 42 is provided at its distal end with a connection flange 425 connected to the winding jig 2.

As shown in FIG. 1 and FIG. 2, the flexible joint 42 is composed of: a first portion 421 extending coaxially with the straight portion 41; a second portion 422 extending at a 90 degree angle from the first portion 421; a third portion 423 extending at a 90 degree angle from the second portion 422 and in parallel with the straight portion 41; and a fourth portion 424 extending at a 90 degree angle from the third portion 423. The aforementioned connection flange 425 is arranged at the distal end of the fourth portion 424.

The connection flange 425 is so positionally adjusted that the center point of the base holder 20 of the winding jig 2 lies on the axis of the straight portion 41 when the flange 425 is connected to the base holder 20.

Moreover, the fixed position of the connection flange 425 relative to the circumference of the winding jig 2 can be suitably positioned where the axis C ("winding axis") of the bobbin 3 is aligned with the rotational axis ("center swing axis") C2 of the straight portion 41 of the turning device 4.

With reference to FIG. 4 to FIG. 14, a method will be described for forming motor coils 9 having the single-pole coils 90 adjoining each other, using the coil forming apparatus 1 including the winding jig 2 and the turning device 4 thus far described. Here, the turning device 4 is omitted from the figures.

Figure 4:
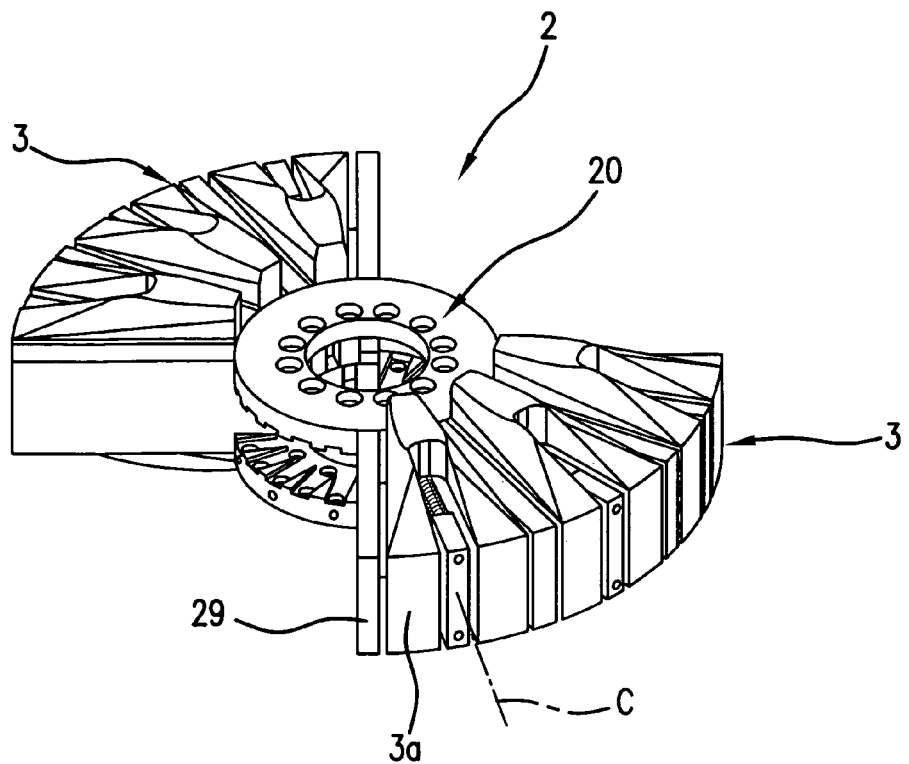
FIG. 4 is a perspective view showing the state of the first embodiment, in which all the bobbins of the winding jig are retracted inward.

With all the bobbins 3 of the winding jig 2 being moved inward, as shown in FIG. 4, the winding jig 2 is first fixed on the turning device 4 so that the rotational axis C2 of the turning device 4 is aligned with the axis C of the first bobbin 3a.

Figure 5:
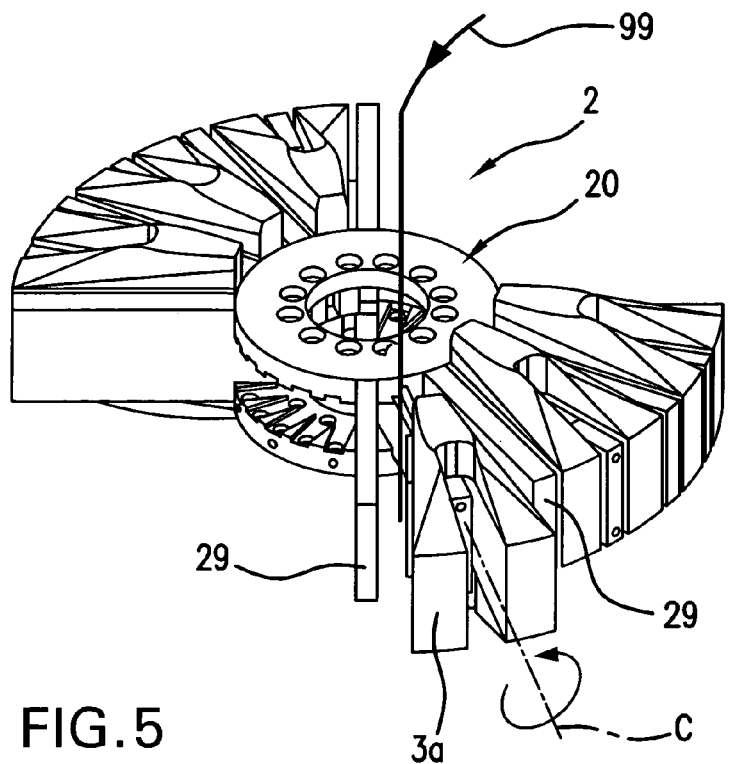
FIG. 5 is a perspective view showing the state of the first embodiment, in which a first bobbin of the winding jig is extended.

Next, the first bobbin 3a is moved radially outward so as to protrude farther than the other bobbins 3, as shown in FIG. 5. For this movement, the bobbin 3a is released from the radially inward position in which the bobbin 3a has been fixed by the positioning pins 38 (FIG. 15 to FIG. 17), and is moved forward against the springs 36. The bobbin 3a is fixed again in the radially outward position by the positioning pins 38.

The electric wire 99 is then fed downward, as shown in FIG. 5, and its leading end is fixed on the winding jig 2. The wire is fixed at a predetermined position by a method using a special fixing device or by a method for binding at an arbitrary position of the winding jig 2. The latter method is adopted in this embodiment.

Figure 6:
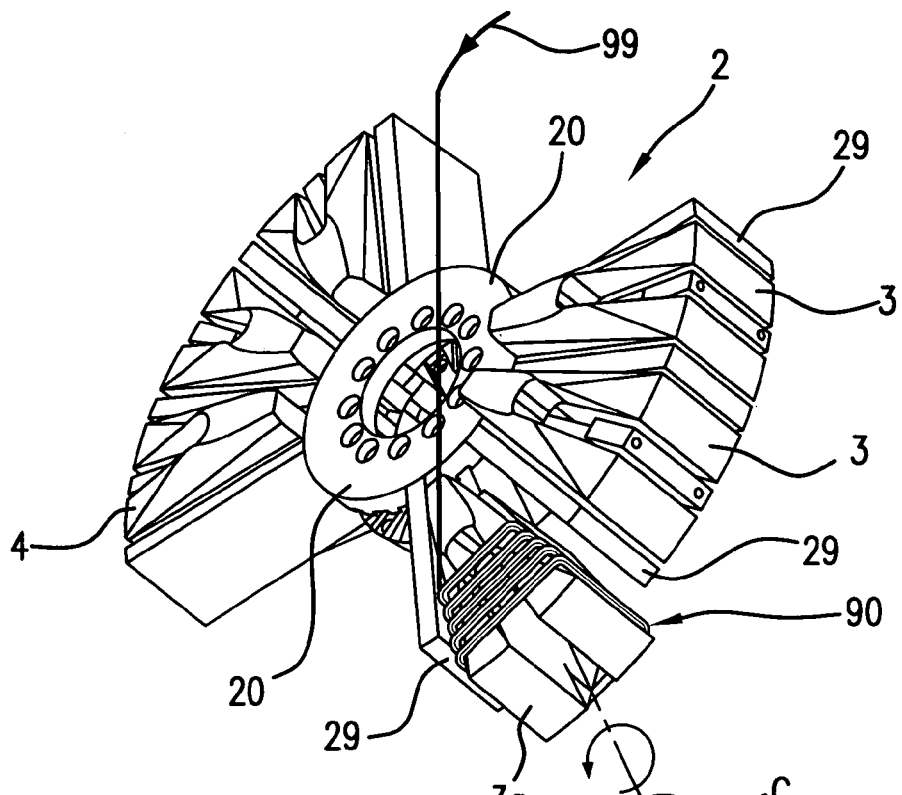
FIG. 6 is a perspective view showing the state of the first embodiment, in which the winding jig is rotated on the axis of the first bobbin to wind an electric wire thereon.
Figure 7:
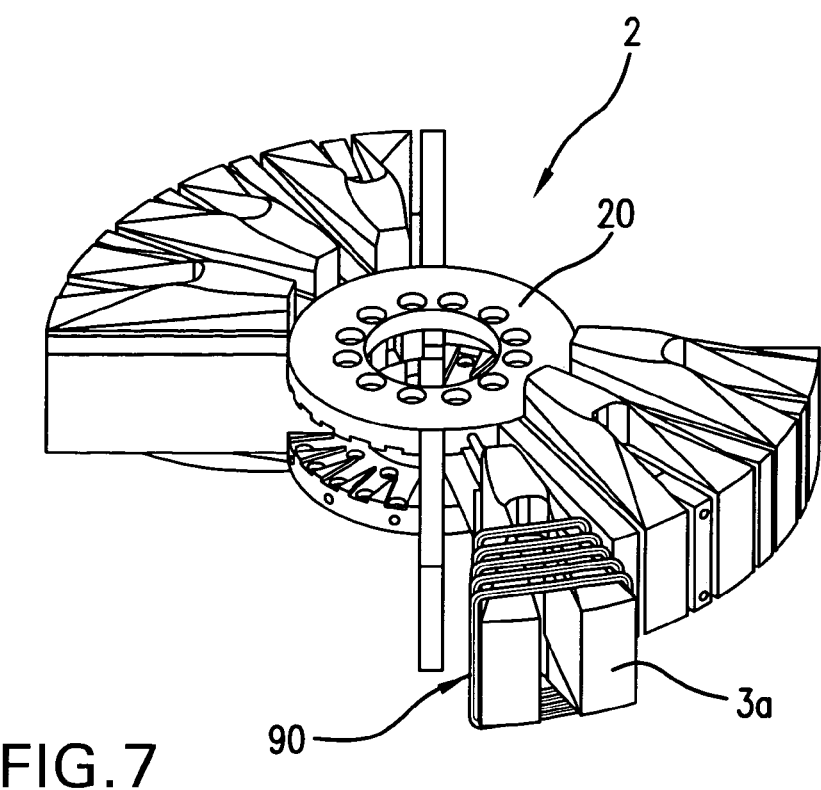
FIG. 7 is a perspective view showing the state of the first embodiment, in which the winding of the electric wire around the first bobbin is completed.

Next, a winding or coiling is performed, as shown in FIG. 5 and FIG. 6, by feeding the electric wire 99 to the protruded bobbin 3a and by driving the turning device 4 to turn the whole winding jig 2 around the winding axis C of the bobbin 3a. As a result, the electric wire 99 is wound on the protruded bobbin 3a, as shown in FIG. 7, to complete the formation of the first single-pole coil 90.

Figure 8:
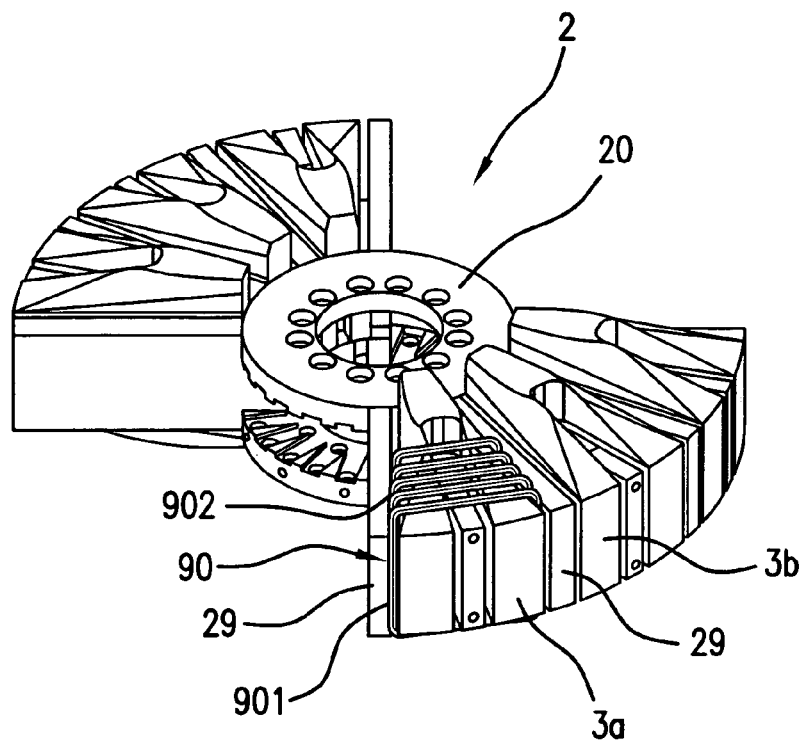
FIG. 8 is a perspective view showing the first embodiment with the first bobbin retracted.

Next, as shown in FIG. 8, the first bobbin 3a having the single-pole coil 90 is retracted. At this time, the bobbin 3a is again fixed in the radially inward position by the positioning pins 38 (FIG. 15 to FIG. 17).

As shown in FIG. 8, the single-pole coil 90 formed around the bobbin 3a is exposed at its end portions 902, located at the upper and lower portions of its loop, exposed to the front and back sides of the bobbin 3a, and has runs 901 inserted in the clearance between the separation plate 29 and the bobbin 3a.

Figure 9:
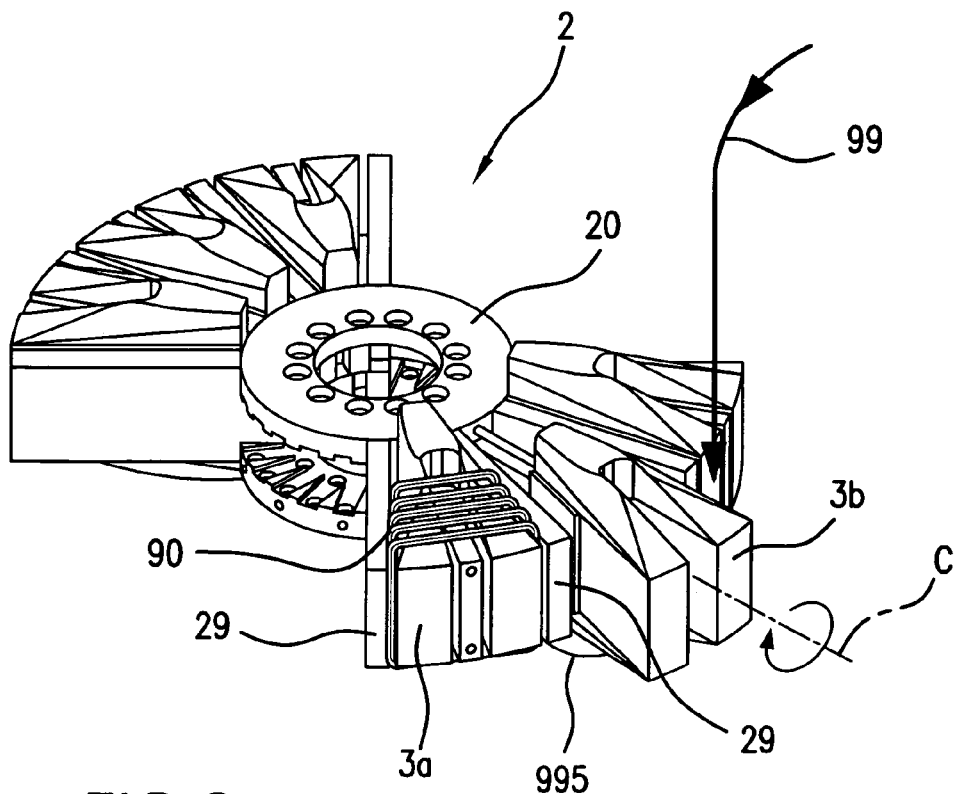
FIG. 9 is a perspective view of the first embodiment with a second bobbin of the winding jig extended forward.

Next, a second bobbin 3b adjoining the first bobbin 3a having the single-pole coil 90 is moved outward along the axis C and to protrude farther than the other bobbins 3, as shown in FIG. 9. The second bobbin 3b is then fixed as before in the extended position.

Before or after this extension of bobbin 3b, the angular position of the winding jig 2 relative to the turning device 4 is changed (indexed) to align the center swing axis C2 of the turning device 4 with the winding axis C of the second bobbin 3b.

As shown in FIG. 9, a crossover wire 995 leads from the single-pole coil 90 held by the first bobbin 3a below the second bobbin 3b, and the succeeding electric wire 99 is fed downward as before in a straight line.

Figure 10:
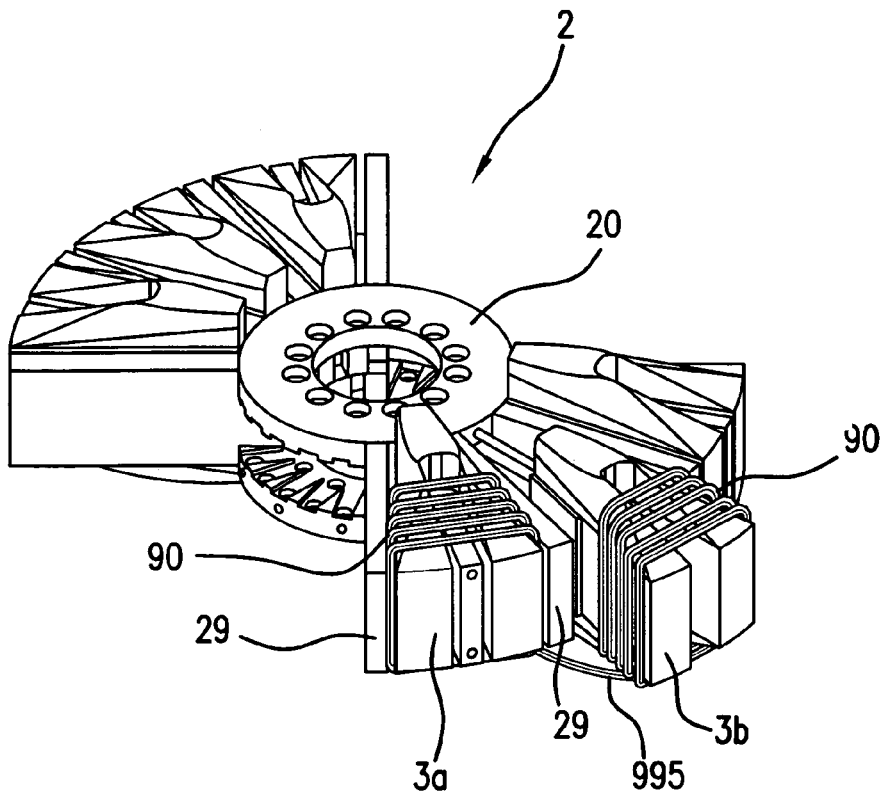
FIG. 10 is a perspective view of the first embodiment in which the winding jig is rotated on the axis of the second bobbin to complete the winding.

Next, the winding is performed by feeding the electric wire 99 in one direction to the extended bobbin 3b and by turning the whole winding jig 2 around the winding axis C of the bobbin 3b, as shown in FIG. 9 and FIG. 10. The direction of turning at this time is reversed from that of the winding on the first bobbin 3a. As a result, the electric wire 99 is wound on the extended bobbin 3b, as shown in FIG. 10, to complete the formation of the second single-pole coil 90.

Figure 11:
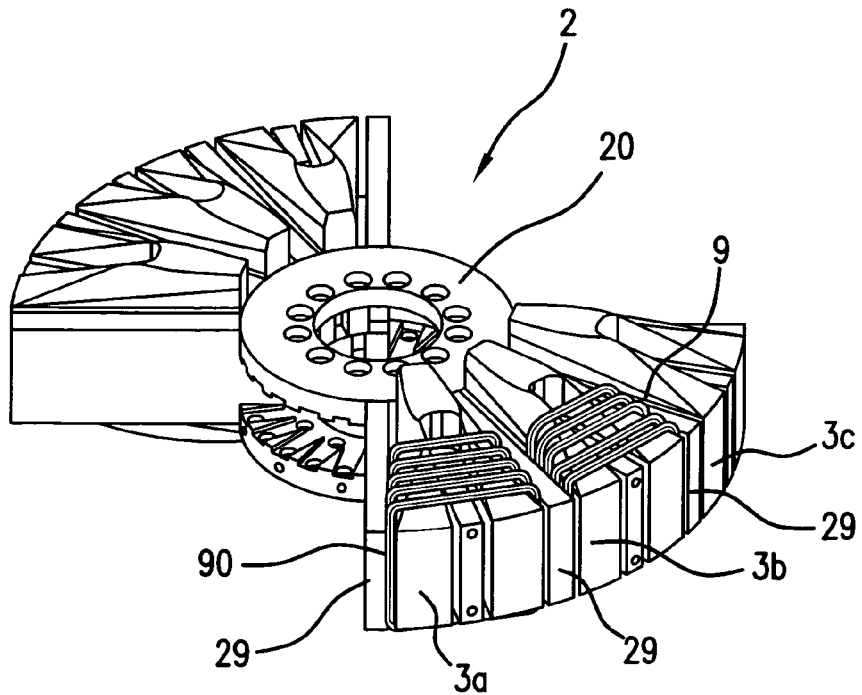
FIG. 11 is a perspective view of the first embodiment with the second bobbin retracted.

Next, the second bobbin 3b having the single-pole coil 90 is retracted and is fixed as before in the radially inward position, as shown in FIG. 11.

As shown in FIG. 11, the single-pole coil 90 formed around the bobbin 3b is also exposed at the upper 902 and lower portions of its loop, exposed to the front and back sides of the bobbin 3b, and has right and left portions 901 in the clearances between the separation plate 29 and the bobbin 3b.

Figure 12:
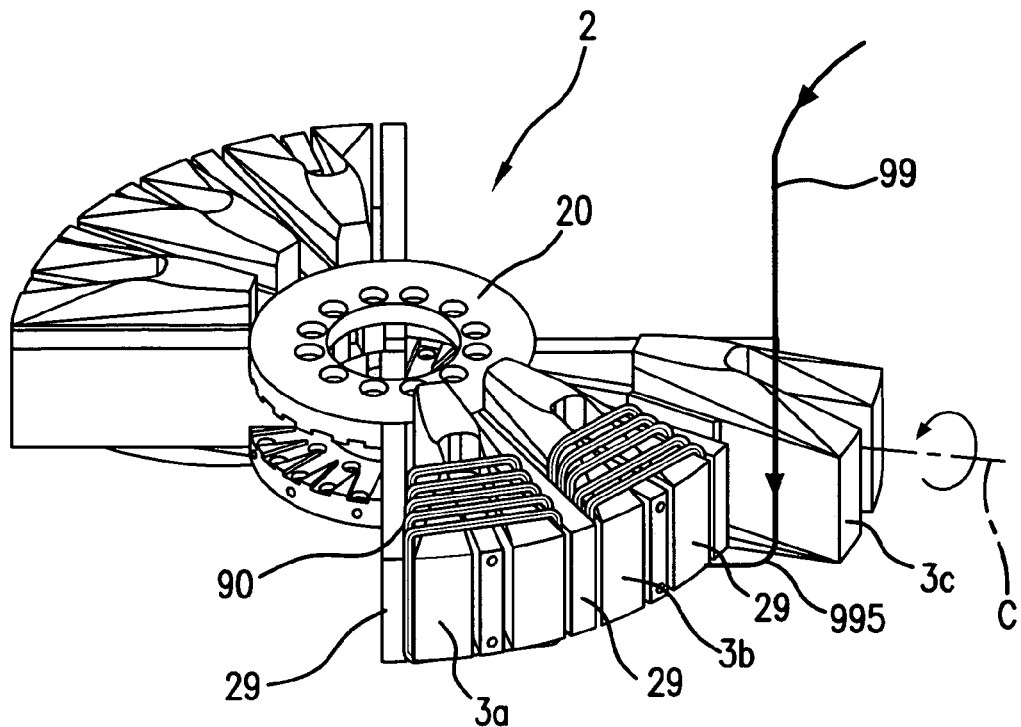
FIG. 12 is a perspective view of the first embodiment with a third bobbin of the winding jig extended forward.

Next, a third bobbin 3c adjoining the second bobbin 3b is extended radially outward along the winding axis C and protrudes farther than the other bobbins 3, as shown in FIG. 12. The third bobbin 3c is then fixed as previously described in this radially outward (extended) position. In this case, too, before or after this outward movement of bobbin 3c, the engaging positions of the winding jig 2 and the turning device 4 are changed to align the center swing axis C2 (in FIG. 1 and FIG. 2) of the turning device 4 and the winding axis C of the third bobbin 3c.

As shown in FIG. 12, moreover, the electric wire 99, following the crossover wire 995 extending from the single-pole coil 90 held by the second bobbin 3b, is fed as before downward in one direction.

Figure 13:
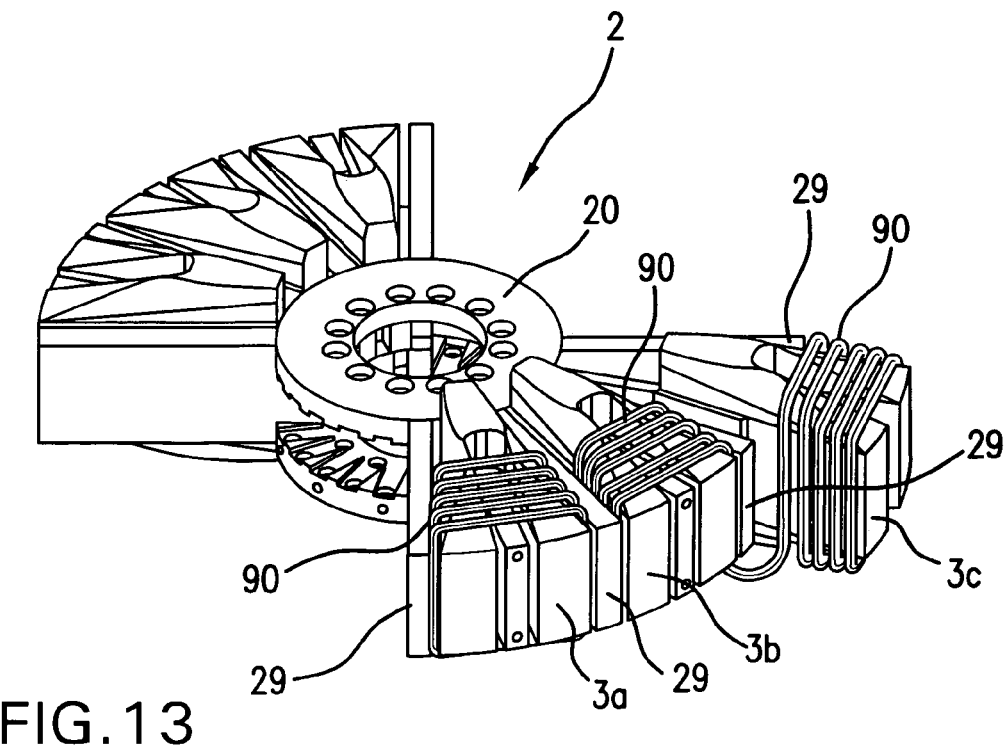
FIG. 13 is a perspective view of the first embodiment with the winding jig rotating on the axis of the third bobbin to complete the winding of the electric wire.

Next, the electric wire 99 is fed in one direction to the extended bobbin 3c and, by turning the whole winding jig 2 around the winding axis C of the bobbin 3c, is wound on the bobbin 3c as shown in FIG. 12 and FIG. 13. The turning direction at this time is reversed from that of the winding on the second bobbin 3b. As a result, the electric wire 99 is wound on the extended bobbin 3c, as shown in FIG. 13, to complete the formation of the third single-pole coil 90.

Figure 14:
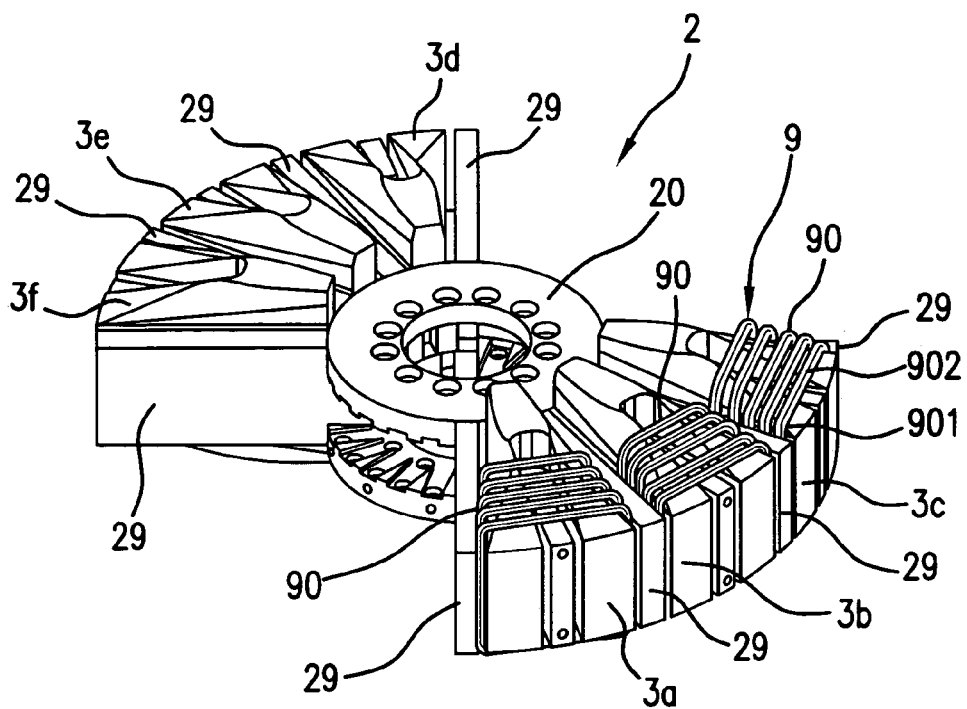
FIG. 14 is a perspective view of the first embodiment with the third bobbin retracted.

Next, the third bobbin 3c having the single-pole coil 90 is retracted and is fixed as before in the radially inward position, as shown in FIG. 14.

As shown in FIG. 14, the coil insertion portion 901 of the third single-pole coil 90 formed around the bobbin 3c is also housed in the clearances between the separation plate 29 and the bobbin 3.

As a result, the coil 9 is completed with the three single-pole coils 90 adjoining each other in the alternately reversed winding directions.

Next, three bobbins 3d to 3f, opposed to the three bobbins 3a to 3c having the aforementioned motor coil 9, can also be wound by the procedure as described before to thereby form the motor coil 9, in which the three single-pole coils 90 adjoin each other in alternately reversed winding directions, as shown in FIG. 14.

The winding jig 2 in this embodiment is constructed to wind the electric wire 99 by extending one of the three bobbins 3 farther than the remaining two and winding the wire on this extended bobbin. Moreover, the bobbins 3 are so arranged on the base holder 20 that they may move without their C axes aligned.

In winding the electric wire 99 the winding axes C of the individual bobbins 3 are sequentially brought close to the center swing axis C2 of the winding jig 2. Moreover, the bobbins 3 are so arranged on the base holder 20 that a virtual line R joining the centers G of gravity of the bobbins 3 has a generally circular shape and that the winding axes C of the individual bobbins 3 extend radially outward from the center O of the generally circular virtual line R (see FIG. 1).

In this embodiment, moreover, the bobbin 3 to be wound is fed with the electric wire 99, and the winding jig 2 is turned as a whole around the winding axis C of the bobbin 3 or around a line substantially parallel to the axis to wind the electric wire 99 on the bobbin 3 which is extended farther than the remaining bobbins 3, to thereby form the single-pole coils 90. However, the winding of the electric wire 99 could be performed by bringing the winding axis C of the bobbin 3, to be wound with the electric wire 99, sequentially closer to the center swing axis C2 of the winding jig 2.

The coil forming method of this embodiment utilizes the winding jig 2 having a structure composed of the base holder 20, the bobbins 3, and the turning device ("rotation means") 4. Moreover, the bobbin extension, the winding step and the bobbin retraction are performed sequentially for each of the individual bobbins.

Here, because the winding step is performed by turning the whole winding jig around the winding axis C of the extended bobbin 3, the electric wire 99 can be continuously fed in one direction so that the single-pole coil 90 can be formed on the bobbin 3 without twisting the electric wire 99.

Moreover, because the bobbin can be moved forward and backward, it is unnecessary to provide any special space for feeding the electric wire between adjacent bobbins 3. This makes it possible to reduce the length of the crossover wire 995 between the single-pole coils 90.

In this embodiment, moreover, each bobbin 3 of the winding jig 2 has a generally sector shape and is provided with the shaping blocks 33 and 34 on its front face and back face. These shaping blocks 33 and 34 become thicker radially inward. Therefore, the single-pole coil 90 wound on the bobbin 3 has its electric wire loops changed in shape along the winding axis C of the bobbin 3.

Specifically, the electric wire loops composing the single-pole coil 90 become wider outward along the sector-shaped bobbin 3 and tapered downward along the shapes of the shaping blocks 33 and 34. As a result, the coil end portion 902 at the time when the coil is mounted in the stator core can be optimumly arranged, as will be described hereinafter.

In the winding jig 2 of this embodiment, moreover, the contour formed of the distal ends of all the retracted bobbins 3 has a circular shape so that the individual bobbins 3 can be positioned to confront the inner circumference of the later-described stator core.

At both sides of each bobbin 3 are located the separation plates 29 which extend from the outer circumference of the base holder 20. The clearances between the separation plates 29 and the bobbin 3 function as coil retaining grooves 290. Here, these coil retaining grooves 290 on opposing sides of the separation plate 29 are substantially parallel to each other. Moreover, the individual single-pole coils 90 can be mounted on the stator core by the linear movements along those coil retaining grooves 290, as will be described in connection with the second embodiment.

Embodiment 2

This embodiment presents one example of the method for inserting the motor coils formed by using the coil forming apparatus 1 of the first embodiment, directly into the stator core from the winding jig 2.

Figure 18:
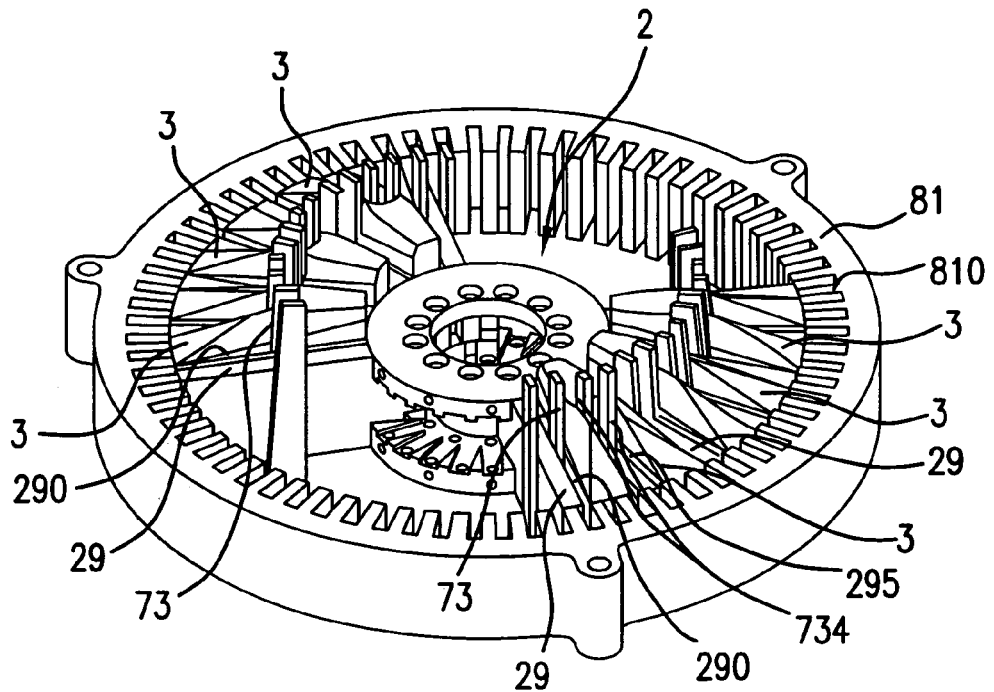
FIG. 18 is a perspective view of an embodiment in which a winding jig is arranged in a stator core.
Figure 19:
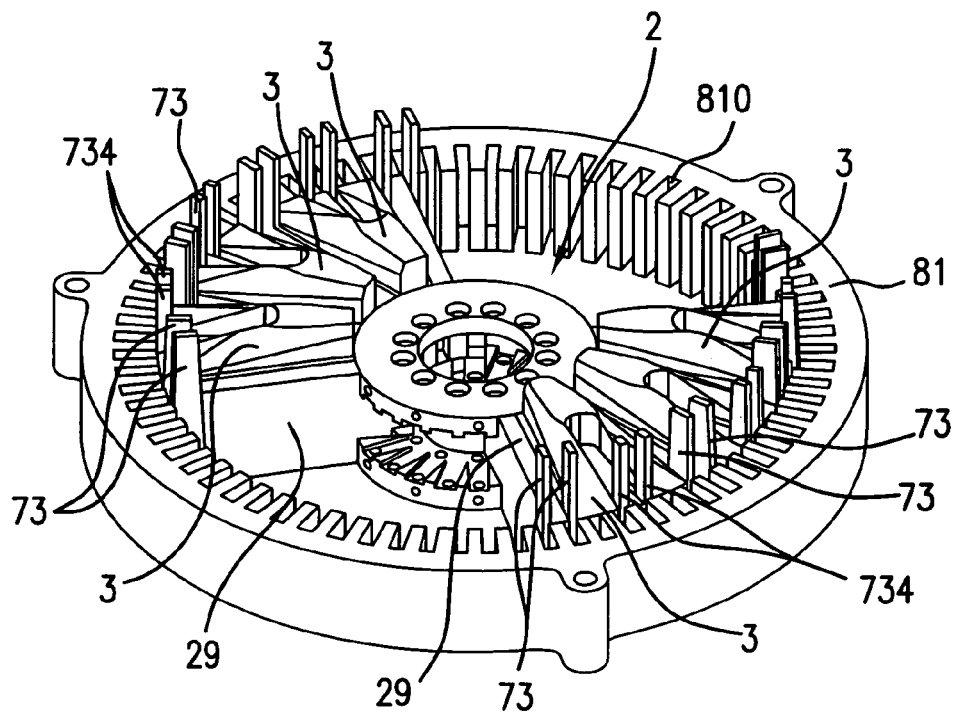
FIG. 19 is a perspective view of the embodiment of FIG. 18 with insertion blades and provisional shaping blades inserted into the winding jig and moved forward.

In this second embodiment, the motor coils 9 (see FIG. 14) are inserted into slots 810 formed in the inner circumferential surface of a ring-shaped stator core 81, as shown in FIG. 18 and FIG. 19. Here in this embodiment, the motor coils 9 (or the single-pole coils 90) are omitted to clarify the motions of insertion blades 734 or the like, as will be described hereinafter.

The motor to be constructed of the stator core 81 is a three-phase DC brushless motor. Moreover, the stator core 81 in this embodiment is prepared by laminating ring-shaped electromagnetic steel sheets. The stator core 81 is provided with an inner circumferential surface with the slots 810 for receiving the coils, as shown in FIG. 18 and FIG. 19.

In this embodiment, the stator core 81 is provided with the seventy-two slots 810 for receiving the thirty six single-pole coils 90 in total. Moreover, the twelve single-pole coils 90 each form one pole. In this embodiment, two sets of motor coils 9, each having three adjoining single-pole coils 90, are prepared by one winding jig 2 and are mounted together on the stator core 81. By performing this procedure six times, all the necessary single-pole coils 90 are mounted on the stator core 81.

The foregoing assembly procedure will now be described in more detail. First of all, the winding jig 2 is arranged in the stator core 81, as shown in FIG. 18, so that the coil retaining grooves 290 of the winding jig 2, located between the bobbin 3 and the separation plates 29, are aligned with the slots 810 of the stator core 81.

As shown in FIG. 18, insertion blades 73 are inserted into the coil retaining grooves 290 of the winding jig 2. The cutouts 320, which are formed in the bobbin bodies 32 of the bobbins 3 in the winding jig 2, and the cutouts 330 and 340, which are formed in the upper and lower shaping blocks 33 and 34 (see FIG. 3), provide provisional shaping grooves 295 for inserting the provisional shaping blades 734.

As shown in FIG. 19, the insertion blades 73 are moved forward in the coil retaining grooves 290 from the center toward the outer circumference. Simultaneously with this movement of blades 73, the provisional shaping blades 734 are moved forward in the provisional shaping grooves 295 from the center toward the outer circumference. As a result, the single-pole coils 90 are pushed by the insertion blades 73 and moved substantially linearly from the coil retaining grooves 290 into the slots 810 of the stator core 81. Moreover, the upper and lower coil end portions 910 (FIG. 14), which bulge out from the stator core 81 are pushed and deformed outward (provisionally shaped) by the provisionally shaping blades 734.

These forward motions of the insertion blades 73 and the provisionally shaping blades 734 are performed simultaneously for all the six single-pole coils 90 so that these six coils 90 are simultaneously inserted into the slots 810 of the stator core 81.

Next, in this second embodiment, a pair of upper and lower tools (not shown) are used to perform a second provisional shaping. The formers are formed into a ring shape with a shaping face confronting the stator core 81 to shape the coils into a desired shape. Specifically, each of the upper and lower formers has a shaping face that is tapered so that its inner circumference protrudes toward the stator core 81. Moreover, when moved forward to the stator core 81, the formers shape the motor coils 9 outward along the tapered shape of the shaping face.

The formers are provided with cutouts for preventing interference with the insertion blades 73 and the provisional shaping blades 734. Moreover, the formers can be pushed onto the stator core 81 while the insertion blades 73 and the provisional shaping blades 734 are being moved forward.

The paired upper and lower formers thus constructed are individually moved forward from their upper and lower positions onto the stator core 81. As a result, the second provisional shaping is performed such that the coil end portions 902, which have bulged out from the upper and lower sides of the stator core 81, are pushed toward the stator core 81.

Next, in this embodiment, the coil forming apparatus 1 of the first embodiment is used to form two sets of motor coils 9, each having the three adjoining single-pole coils 90, on the winding jig 2. Then, the movement of the motor coils 9 from the winding jig 2 directly into the stator core 81 and provisional shaping are performed like before. By repeating this series of steps six times in total, the thirty six single-pole coils 90 in total are mounted on the stator core 81. Moreover, the final shaping, performed as the second provisional shaping by the formers, is repeated for all the thirty-six single-pole coils 90 to properly shape the whole of the motor coils.

Thus, the thirty six single-pole coils 90 in total are inserted and arranged in the stator core 81.

Here, the step of subjecting the six single-pole coils to the second provisional shaping step is performed in a series of procedures in this embodiment and is repeated six times. However, efficiency could be enhanced by using a plurality of sets of winding jigs 2. By increasing the number of the bobbins 3 in the winding jig 2 from six to twelve, moreover, the twelve single-pole coils 90 could be transferred all at once to the stator core 81 to thereby rationalize the process.

In this second embodiment, as has been described hereinbefore, the so-called "linear insertion method" of moving the coils linearly can be executed easily and stably by utilizing the winding jig 2 and the insertion blades 73 thus far described. In short, the single-pole coils 90 can be linearly inserted into the slots 810 without any change in position. This makes it unnecessary to make the vertical length of the motor coils 9 longer than necessary.

In this embodiment, moreover, the motor coil can be transferred directly from the bobbins 3 on which it has been formed to the stator core 81, as described above. After the coils are formed, moreover, they need not be transferred from the bobbins to another coil transfer machine, so that the coils can be more efficiently mounted on the stator core. This advantage is due to the structure of winding jig 2, as has been described in detail in connection with the first embodiment.

Moreover, the motor coils can be inserted from the winding jig 2 directly into the stator core 81 so that the coil transfer can be easily executed even if the crossover wires joining the single-pole coils 90 are short.

Embodiment 3

Figure 20:
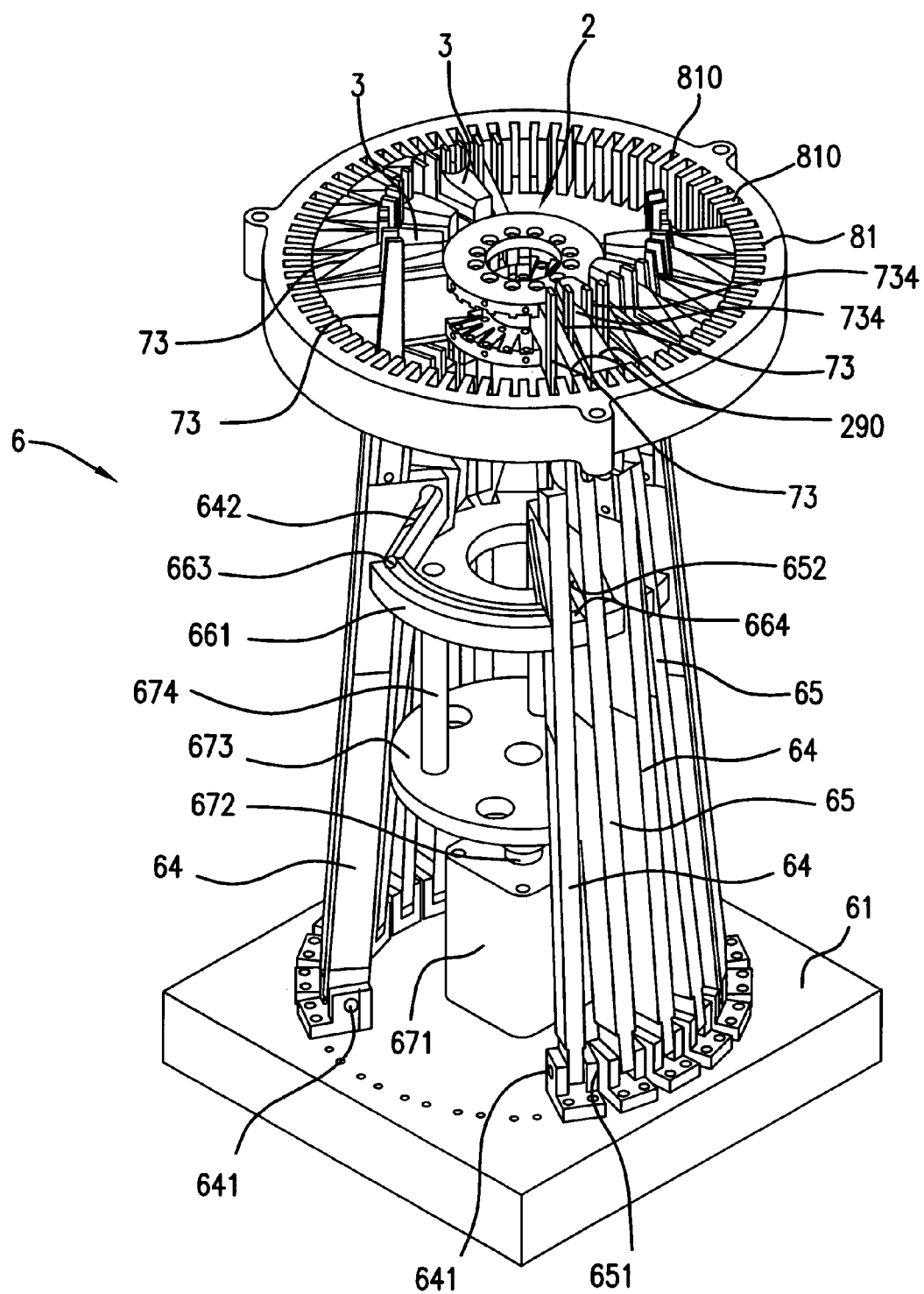
FIG. 20 is a perspective view of a coil inserting apparatus in a third embodiment.
Figure 21:
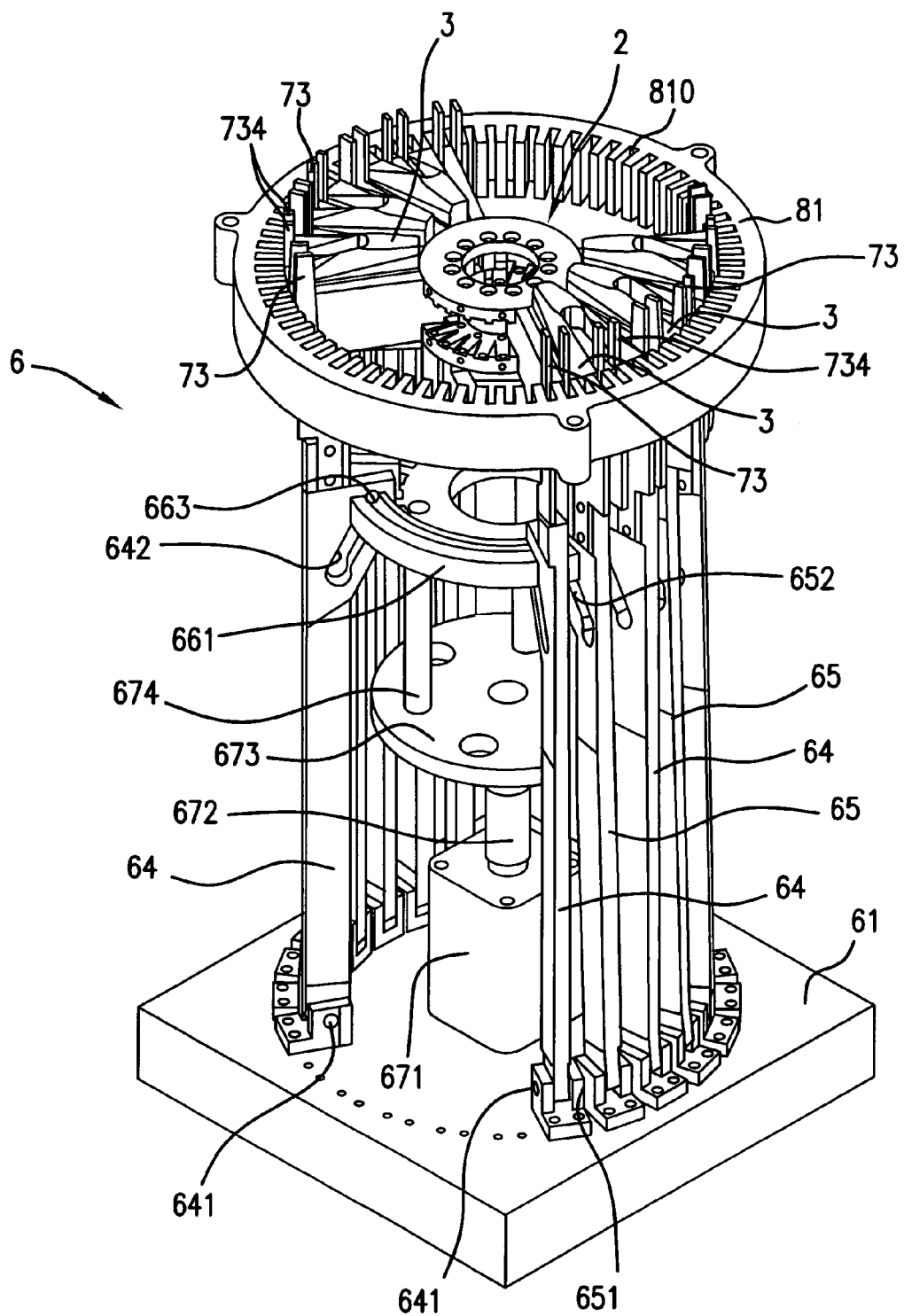
FIG. 21 is a perspective view of the inserting apparatus of FIG. 20 with the insertion blades and provisional shaping blades of the coil inserting apparatus moved forward.
Figure 22:
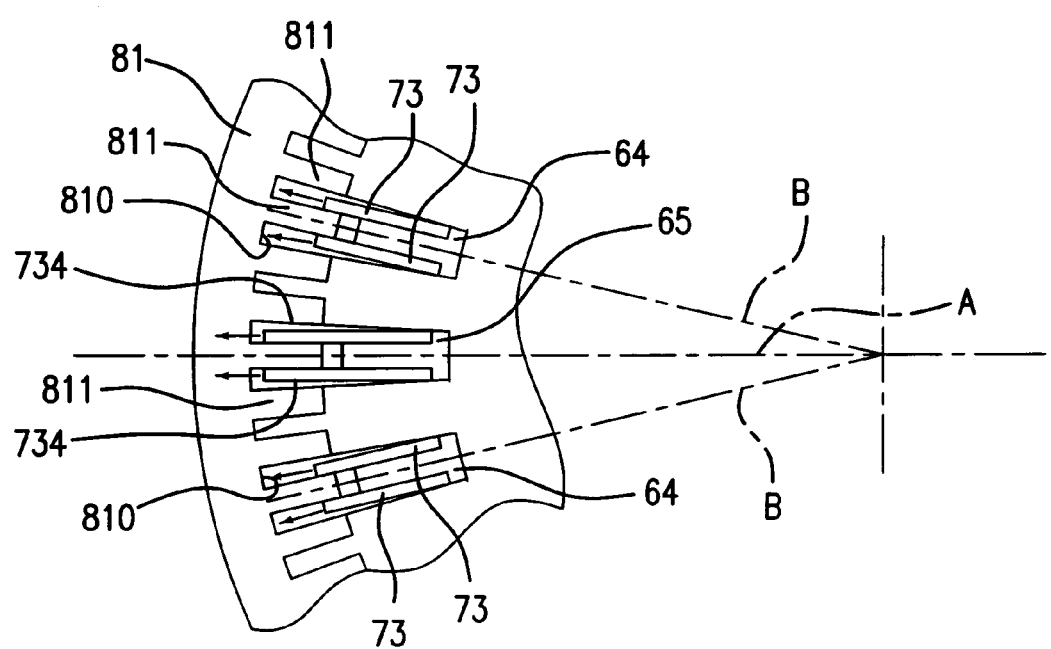
FIG. 22 is a schematic view of the insertion blades and the provisional shaping blades of the third embodiment in advanced positions.

As shown in FIG. 20 to FIG. 22, this third embodiment presents a detailed example of a coil inserting apparatus to be used to transfer the coils from the winding jig 2 into the stator core 81.

The coil inserting apparatus 6 is supported on a bottom plate 61, as shown in FIG. 20 and FIG. 21, with a plurality of first arms 64 arranged to rock on fulcrums 641, and a plurality of second arms 65 arranged to rock on fulcrums 651. As shown in FIG. 20 and FIG. 22, each first arm 64 carries the two insertion blades 73 at its upper end, and each second arm 65 carries the two provisional shaping blades 734 at its upper end.

The first arm 64 is provided with a slot 642, which can engage with a pin 663 embedded on a lifting plate 661. The second arm 65 is also provided with a slot 652, which can engage with a pin 664 also embedded on the lifting plate 661.

Lifting plate 661 is connected to a cylinder 671, a lifting rod 672, a base plate 673, connecting rods 674 and so on, which are arranged above the bottom plate 61. Thus, the lifting plate 661 can be moved upward and downward as the lifting rod 672 driven by the cylinder 671 moves upward and downward.

The slots 642 and 652 respectively formed in the first arms 64 and the second arms 65 are sloped. As the pins 663 and 664 move vertically in the slots 642 and 643, the first arms 64 and the second arms 65 rock on the fulcrums 641 and 651. Here, the slots 642 of the first arms 64 and the slots 652 of the second arms 65 are slightly different in shape so that the first arms 64 and the second arms 65 have different rocking strokes.

As shown in FIG. 22, the two insertion blades 73 are arranged in parallel on each first arm 64 so that they move together in parallel with the rocking direction of the first arm 64. Here, the rocking direction of the first arms 64 is along a radius A extending through the centers of teeth 811 which occupy positions between adjacent slots 810 of the stator core 81.

Likewise, the two provisional shaping blades 734 are arranged in parallel on each second arm 65 so that they move together in parallel with the rocking direction of the second arm 65. Here, the rocking direction of each second arm 65 is along a radius B extending through the centers of teeth 811 which occupy positions between adjacent slots 810 of the stator core 81.

By using the coil inserting apparatus 6 described above, the linear transfer of the coils 9 (or the single-pole coils 90) directly from the winding jig 2 into the stator core 81 can be easily realized.

Embodiment 4

This fourth embodiment uses the aforementioned winding jig 2 to form the motor coil 9 to be used in a stator of a concentrated winding type.

The foregoing Embodiments 1 to 3 exemplify manufacture of a stator of the distributed winding type, in which the single-pole coils 90 wound with the electric wire 99 are distributed and arranged in two or more slots 810 in the stator core 81. Thus, the winding jig 2 forms coils 9 to be used in a stator of the distributed winding type.

In this fourth embodiment, the coils 9 are formed as in the first embodiment but the stator is the concentrated winding type, in which the single-pole coils 90 are individually arranged on the teeth 811 positioned between the adjacent slots 810 of the stator core 81.

Figure 23:
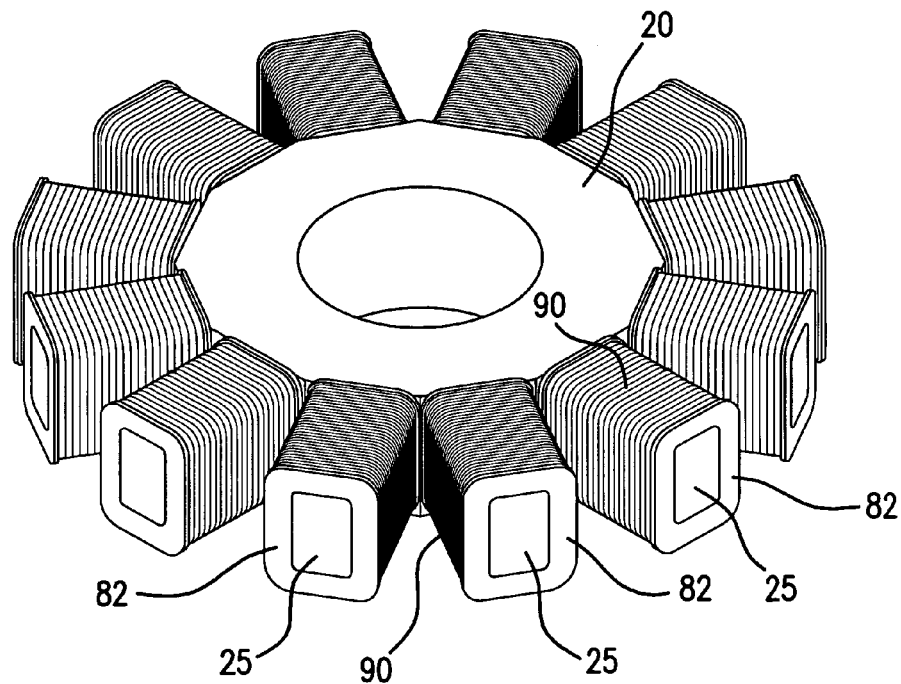
FIG. 23 is a perspective view of a fourth embodiment having single-pole coil forming bobbins attached to projections of a base holder for forming single-pole coils.
Figure 24:
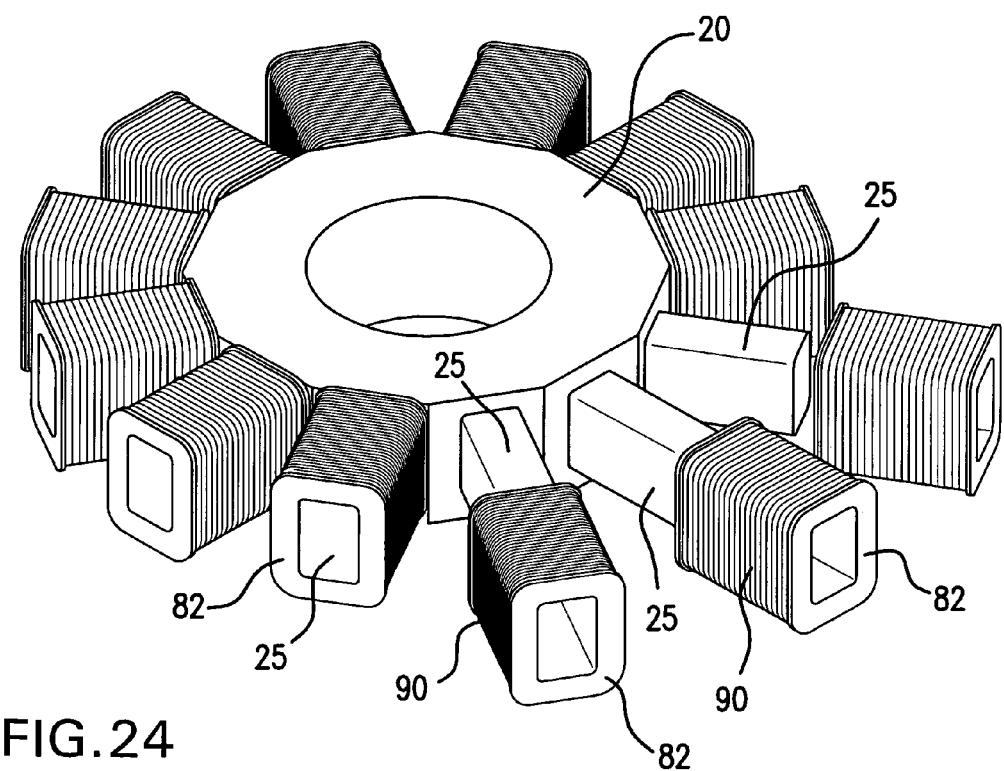
FIG. 24 is a perspective view of the fourth embodiment in which some of the single-pole coil forming bobbins having a single-pole coil wound thereon are removed from the projections of the base holder.

In this fourth embodiment, as shown in FIG. 23 and FIG. 24, the winding jig 2 is provided with a plurality of projections 25, which extend from the outer circumference of the base holder 20. A plurality of single-pole coil forming bobbins 82 are mounted on those projections 25.

As before, the winding jig 2 is turned in its entirety around the winding axis C of the bobbin 82 in the winding operation, as shown in FIG. 23, to form the single-pole coils 90 on each bobbin 82. After this, as shown in FIG. 24, the bobbin 82 having the single-pole coils 90 formed thereon is removed from the base holder 20 and is assembled with the teeth 811 of the stator core 81 to produce a stator of the concentrated winding type.

Embodiments 5 and 6

FIG. 25 to FIG. 35 show a fifth embodiment utilizing a coil forming apparatus Z1 for forming a continuous-pole coil Z9 from an electric wire Z99.

FIG. 36 to FIG. 44 show a sixth embodiment described in connection with a coil forming/inserting apparatus Z5 provided with a bobbin Z3 and an inserter jig Z6, and further in connection with a coil transfer step involving transferring the continuous-pole coil Z9 retained in the winding jig Z2, first to the inserter jig Z6, and subsequently from the inserter jig Z6 into the individual slots Z810 of a stator core Z81.

The fifth embodiment relates to a coil forming apparatus and a coil forming method, and the sixth embodiment relates to the coil forming/inserting apparatus and the coil forming/inserting method.

The winding jig Z2 used in the sixth embodiment is identical to the winding jig Z2 used in the fifth embodiment, and the sixth embodiment may be described with reference to any of FIG. 25 to FIG. 35.

Here in the fifth and sixth embodiments, the bobbin 3 of the first embodiment corresponds to coil bobbin Z3. Moreover, the axis C of the bobbin 3 in the first embodiment corresponds to the winding axis ZC1 of the coil bobbin Z3. Further, the base holder 20 of the first embodiment corresponds to an index holder ("indexing means") Z22. The motor coil 9 of the first embodiment corresponds to the continuous-pole coil Z9.

On the other hand, the turning device of the first embodiment corresponds to a swing device and a swing arm Z21 and the turning center C2 of the turning device of the first embodiment corresponds to the center swing center axis ZC2 of the swing arm Z21.

Embodiment 5

Figure 25:
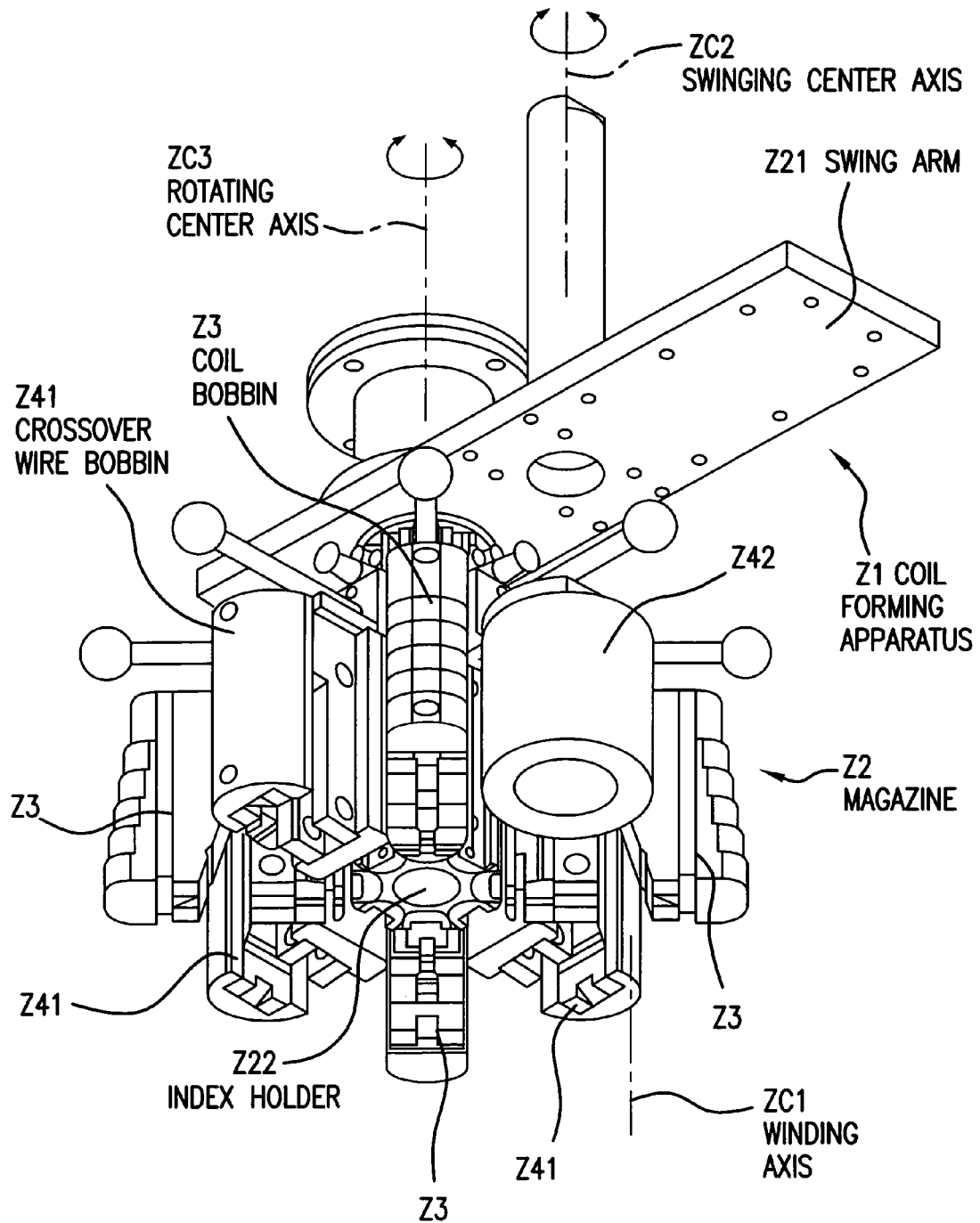
FIG. 25 is a perspective view of a coil forming apparatus of a fifth embodiment.
Figure 26:
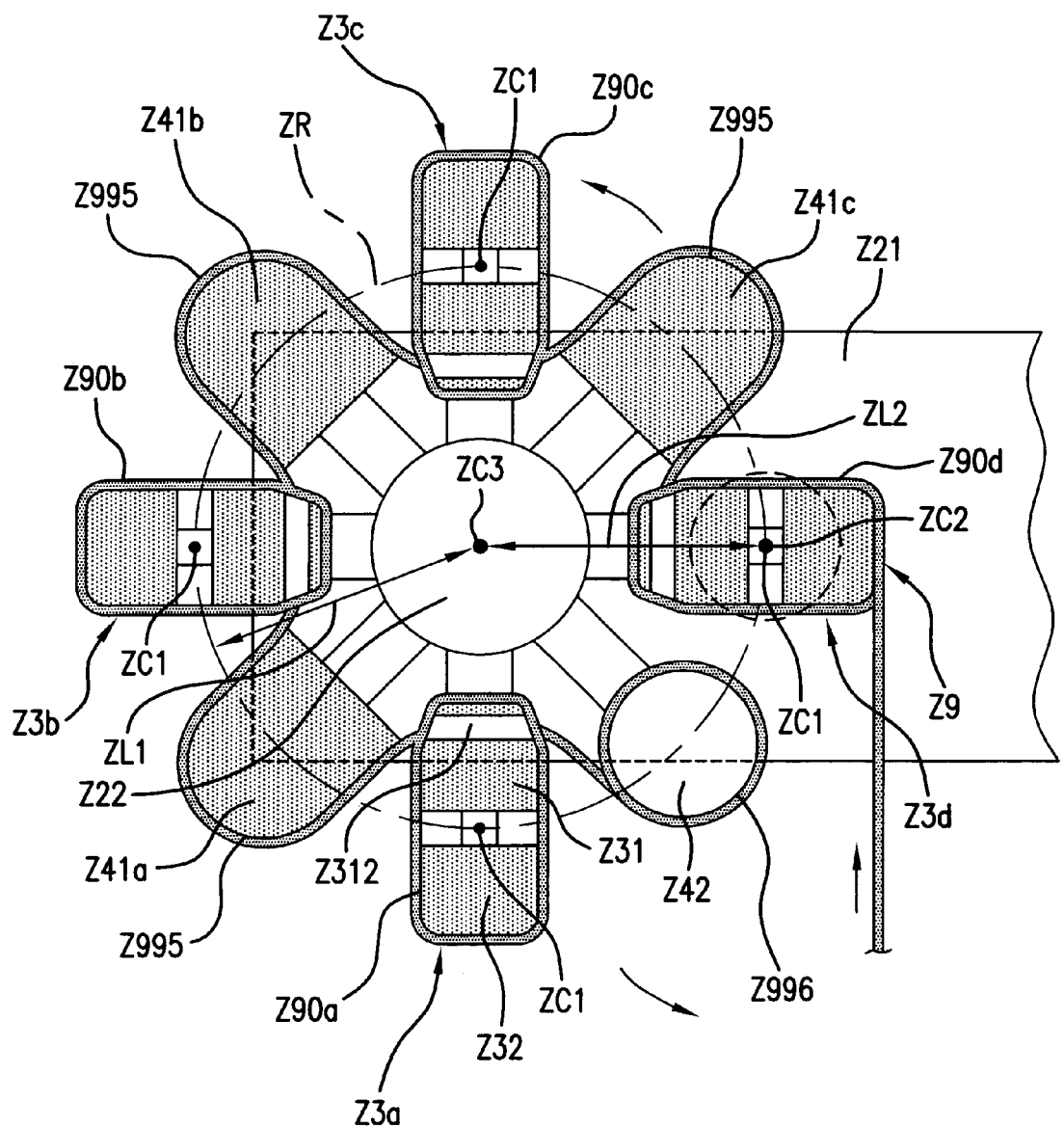
FIG. 26 is a schematic view of the fifth embodiment illustrating formation of individual single-pole coils on the individual coil bobbins to form a continuous-pole coil.

As shown in FIG. 25 and FIG. 26, the coil forming apparatus Z1 of this fifth embodiment forms the continuous-pole coil Z9 as a motor coil by continuously forming a plurality of single-pole coils Z90, having the electric wire Z99 wound thereon, in a loop shape. The coil forming apparatus Z1 includes a (not-shown) frame; a swing arm Z21 supported on the frame for swinging motion about the center swing axis ZC2 of the (not-shown) swinging device and a winding jig Z2. Moreover, this winding jig Z2 is provided with index holder Z22 movable relative to the swing arm Z21, and a plurality of coil bobbins Z3 arranged on the outer circumference of the index holder Z22.

The individual winding axes ZC1 of the individual coil bobbins Z3, on which the electric wire Z99 is wound, are substantially parallel, not only to each other but also to the center swing axis ZC2. Moreover, the coil forming apparatus Z1 is designed to move the index holder Z22 to bring the coil bobbins Z3 for winding the electric wire Z99, in sequence, close to the center swing axis ZC2.

Within the winding jig Z2 of this fifth embodiment, the index holder Z22 can rotate around the center axis of rotation ZC2, which is substantially perpendicular to the center swing axis ZC2. The individual coil bobbins Z3 are so arranged on the index holder Z22 that the individual winding axes ZC1 for winding the electric wire Z99 are parallel to the center axis of rotation ZC2. By rotating the index holder Z22, the directions of the winding axes ZC1 of the coil bobbins Z3 can be sequentially brought into substantial alignment with the central swing axis ZC2.

As shown in FIG. 25 and FIG. 26, the index holder Z22 is arranged to rotate around a center axis of rotation ZC3 which is offset from and substantially in parallel with the center swing axis ZC2 and is rotably supported by the swing arm Z21. On the other hand, the individual coil bobbins Z3 are arranged in the index holder Z22 at substantially equal distances from the center axis of rotation ZC3.

The distance ZL1 from the center axis of rotation ZC3 to the winding axis ZC1 of each of the coil bobbins Z3 ("bobbin distance") is substantially equal to the offset distance ZL2 from the center swing axis ZC2 of the swing arm Z21 to the center axis of rotation ZC3 of the index holder Z22.

By rotating the index holder Z22 through a predetermined angle relative to the swing arm Z21, the winding axes ZC1 of the coil bobbins Z3 for winding the electric wire Z99 can be substantially aligned, in sequence, with the center swing axis ZC2. In this substantially aligned state, the electric wire Z99 is wound on the substantially aligned bobbin.

Moreover, the continuous-pole coil Z9 having the arcuately continuous coils can be formed (see FIG. 35) of the individual coil bobbins Z3 arranged in the arcuate shape.

Figure 27:
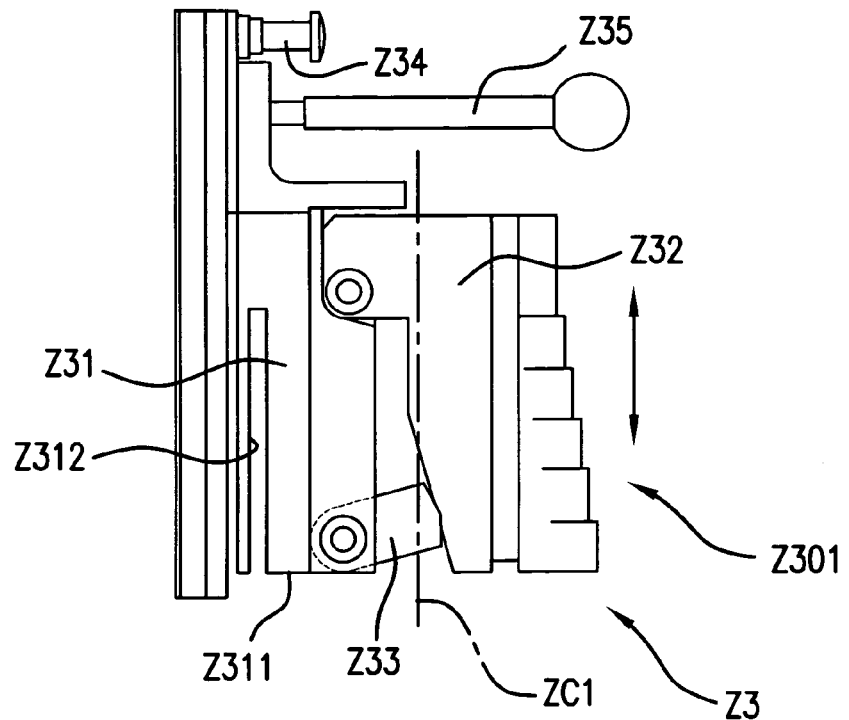
FIG. 27 is a perspective view of an outer bobbin portion in a winding position in the fifth embodiment.

As shown in FIG. 27, each coil bobbin Z3 is arranged to move toward and away from the center swing axis ZC2, i.e., movement relative to the index holder Z22. Moreover, the coil bobbin Z3 for winding the electric wire Z99 can be moved forward, away from the swing arm Z21, so that it is extended relative to the other coil bobbins Z3. Therefore, the extended coil bobbin Z3 can easily receive the electric wire Z99 in the direction perpendicular to the winding axis ZC1 to thereby facilitate the feed of the electric wire Z99 and the winding of the electric wire Z99 on the coil bobbin Z3.

As shown in FIG. 26, the individual coil bobbins Z3 are arranged in an arcuate manner on the outer circumference of the index holder Z22. In this embodiment, the individual coil bobbins Z3 are radially arranged at substantially equal spacings on the outer circumference of the index holder Z22. In this fifth embodiment, moreover, the four coil bobbins Z3 are so arranged as to form the continuous-pole coil Z9 having the four continuous single-pole coils Z90.

Figure 28:
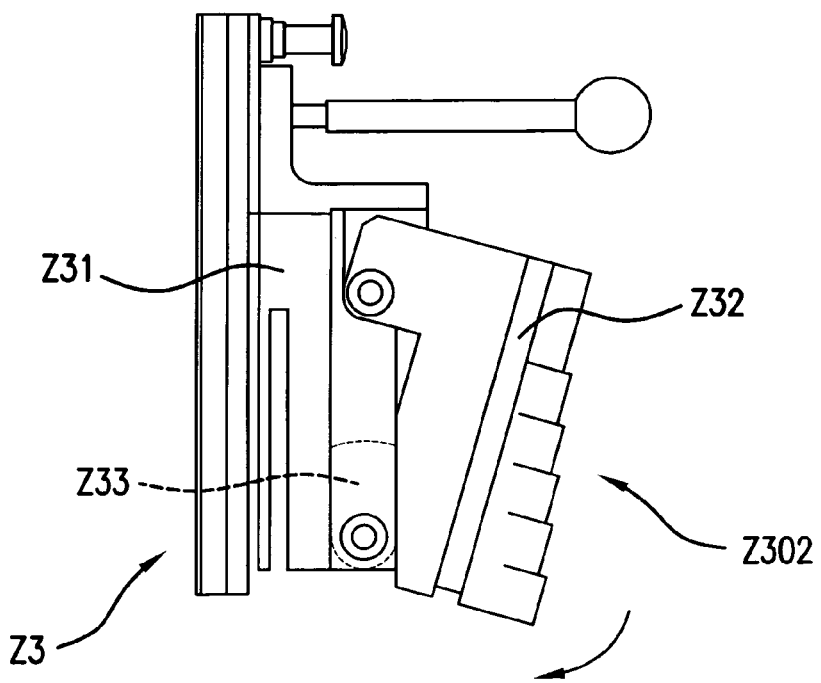
FIG. 28 is a perspective view of the bobbin portion of FIG. 27 in a releasing position.

As shown in FIG. 27 and FIG. 28, each coil bobbin Z3 is provided with an inner bobbin portion Z31 attached to the index holder Z22, and an outer bobbin portion Z32 arranged fronting (in parallel with) the inner bobbin portion Z31. The outer bobbin portion Z32 can move to change between a winding position Z301 at the time of winding the electric wire Z99, as shown in FIG. 27, and a releasing position Z302 at the time of releasing the single-pole coil Z90 after winding, as shown in FIG. 28.

The outer bobbin portion Z32 is diametrically enlarged stepwise in the forward direction away from the swing arm Z21. Thus, the external diameter of the coil bobbin Z3 as a whole is stepwise enlarged in the forward direction and the single-pole coil Z90 can be formed with the winding diameter of the electric wire Z99 enlarged in the forward direction. It is also possible to form a single-pole coil Z90 having a winding diameter of the normal size which is determined by the distance between the outer bobbin portion Z32 and the inner bobbin portion Z31.

Moreover, the continuous-pole coil Z9 composed of the individual single-pole coils Z90 can be inserted and arranged in the slots Z810 of the stator core Z81 such that the side with the larger winding diameter is positioned at the opening sides of the slots Z810. Moreover, the coil end portions formed as protrusions of the individual single-pole coils Z90 from the two axial end portions of the stator core Z81 can be reduced in size by deforming the protrusions from the opening sides outward of the stator core Z81. In other words, the individual single-pole coils Z90 are formed to have winding diameters enlarged from one side to the other side, so that the length of the single-pole coils Z90 can be the necessary minimum to thereby reduce the coil end portions.

When the outer bobbin portion Z32 is set at the releasing position Z302, as shown in FIG. 28, the external diameter of the coil bobbin Z3 is smaller in the forward direction. Moreover, the distance between the outer bobbin portion Z32 and the inner bobbin portion Z31 is reduced so that each single-pole coil Z90 can be easily released.

In this embodiment, as shown in FIG. 27 and FIG. 28, each coil bobbin Z3 is provided with a handle Z35, which is manually moved forward or backward so that the coil bobbin Z3 is fixed in the advanced or retracted position. Alternatively, the outward or inward movement of each coil bobbin Z3 can also be performed by using a cylinder or motor.

In this embodiment, moreover, each coil bobbin Z3 is provided with a turnable cam Z33 pivotally supported by inner bobbin portion Z31. The winding position Z301 is established when the cam Z33 is turned up toward the outer bobbin portion Z32, as shown in FIG. 27, and the releasing position Z302 is established when the cam Z33 is turned down toward the inner bobbin portion Z31, as shown in FIG. 28. The outer bobbin portion Z32 can also be moved between the winding position Z301 and the releasing position Z302 by using a cylinder or motor.

As shown in FIG. 25 and FIG. 26, on the other hand, the index holder Z22 is provided between the individual coil bobbins Z3 with crossover bobbins Z41 for winding crossover wires Z995 to join the individual single-pole coils Z90. In this embodiment, three crossover bobbins Z41 are individually arranged between the four coil bobbins Z3. By winding the electric wire Z99 around the crossover bobbins Z41, moreover, the crossover wires Z995 of a specified length can be formed (see FIG. 35) between the single-pole coils Z90 formed around the coil bobbins Z3.

In this embodiment, as shown in FIG. 25 and FIG. 26, a lead bobbin Z42 is arranged between a first coil bobbin Z3$a$ for the first winding of the electric wire Z99 and a fourth coil bobbin Z3$d$ for the last winding. The lead bobbin Z42 is provided for winding the electric wire Z99 to retain a lead wire Z996 of a predetermined length before the winding operation of the first coil bobbin Z3$a$. The lead wire Z996 is that portion of the electric wire Z99 leading to the winding end portion of a first single-pole coil Z90$a$ to be formed on the first coil bobbin Z3$a$ (see FIG. 35).

In this embodiment, moreover, the lead bobbin Z42 has a generally circular section shape so that it can retain the lead wire Z996 of the predetermined length stably on the winding end portion of the first single-coil Z90$a$ without folding or bending the electric wire Z99.

Like the aforementioned coil bobbins Z3, moreover, the crossover bobbins Z41 and the lead bobbin Z42 can also move forward or backward on the center swing axis ZC2 relative to the index holder Z22. Therefore, the crossover bobbins Z41 and the lead bobbin Z42 can move in the forward direction away from the swing arm Z21, relative to the remaining coil bobbins Z3 and crossover bobbins Z41, to protrude farther than the other coil bobbins Z3 and crossover bobbins Z41.

As shown in FIG. 25 and FIG. 26, the swing arm Z21 can swing both forward and backward around the center swing axis ZC2. Moreover, this embodiment forms the continuous-pole coil Z9 with the four single-pole coils Z90 wound in the same direction. Therefore, the swinging directions of the swing arm Z21 for winding the coil bobbins Z3 and for winding the crossover bobbins Z41 are reversed, and the coil forming apparatus Z1 rotates alternately both forward and backward to form the continuous-pole coil Z9.

In the following, the turning direction of the swing arm Z21 for winding the coil bobbins Z3 will be called "forward", and the turning direction of the swing arm Z21 for winding the crossover bobbins Z41 and the lead bobbin Z42 will be called "reverse".

On the frame, although not shown, is a swinging device for turning the swing arm Z21 around its center swing axis ZC2. The swinging device can be manually operated by equipping the swing arm Z21 with a handle. Alternatively, the swinging device may be any of a variety of motors or index cylinders, which are actuated electrically, hydraulically or pneumatically.

Next a coil forming process for forming the continuous-pole coil Z9 by using the coil forming apparatus Z1 will be described.

In this coil forming process, the coil forming apparatus Z1 is used to perform the indexing step, advancing step and winding step, sequentially, for each of the individual coil bobbins Z3, to form the single-pole coils Z90 and then the continuous-pole coil Z9, in turn, formed of the continuous single-pole coils Z90.

In the coil forming apparatus Z1, as shown in FIG. 25, at the initial position of the index holder Z22, the lead bobbin Z42 takes the position at which it is the closest to the center swing axis ZC2 in the swing arm Z21. At this initial position, the winding axis ZC1 of the lead bobbin Z42 is substantially aligned with the center swing axis ZC2 of the swing arm Z21.

Initially, the lead bobbin Z42 is advanced to protrude farther than the other coil bobbins Z3 and crossover bobbins Z41. Then, the lead bobbin Z42 is fed with the electric wire Z99, and the swing arm Z21 is turned in reverse so that the lead bobbin Z42 is wound with the electric wire Z99 to thereby form a predetermined length of the lead wire Z996.

The feed of the electric wire Z99 is performed transversely for the coil forming apparatus Z1, that is, in the direction normal to the winding faces of the individual coil bobbins Z3, the individual crossover bobbins Z41 and the lead bobbin Z42.

Figure 29:
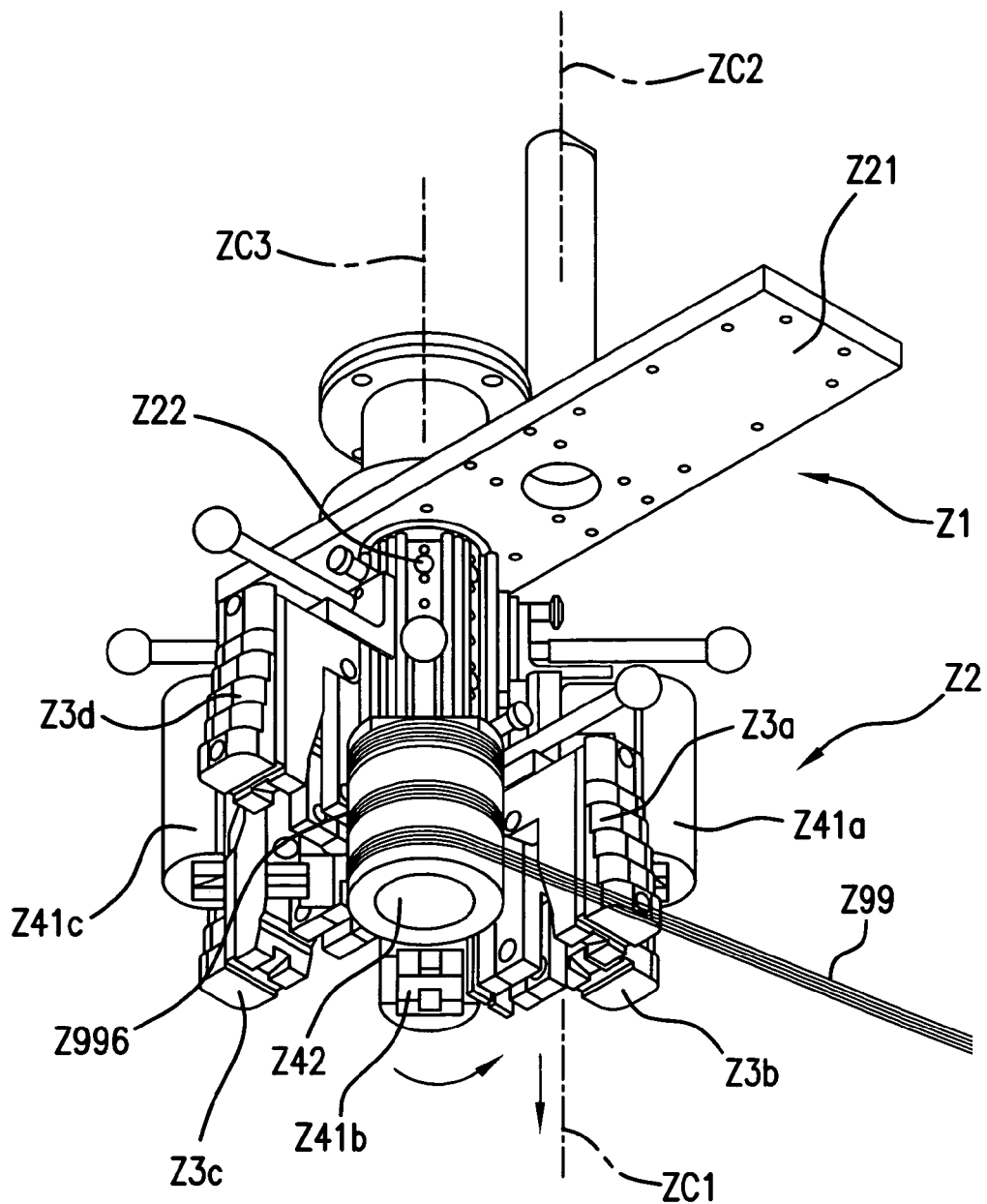
FIG. 29 is a perspective view of the coil forming apparatus of the fifth embodiment with the winding axis of a first coil bobbin substantially aligned with the center swing axis of a swing arm and with the first coil bobbin extended farther than the other bobbins.

Next, in the aforementioned index step, as shown in FIG. 29, the index holder Z22 is rotated through a predetermined angle to bring the winding axis ZC1 of the first coil bobbin Z3$a$ into substantial alignment with the center swing axis ZC2.

At the aforementioned advancing step, moreover, the first coil bobbin Z3$a$ is extended forward to protrude beyond the other bobbins, and the lead bobbin Z42 is retracted.

Figure 30:
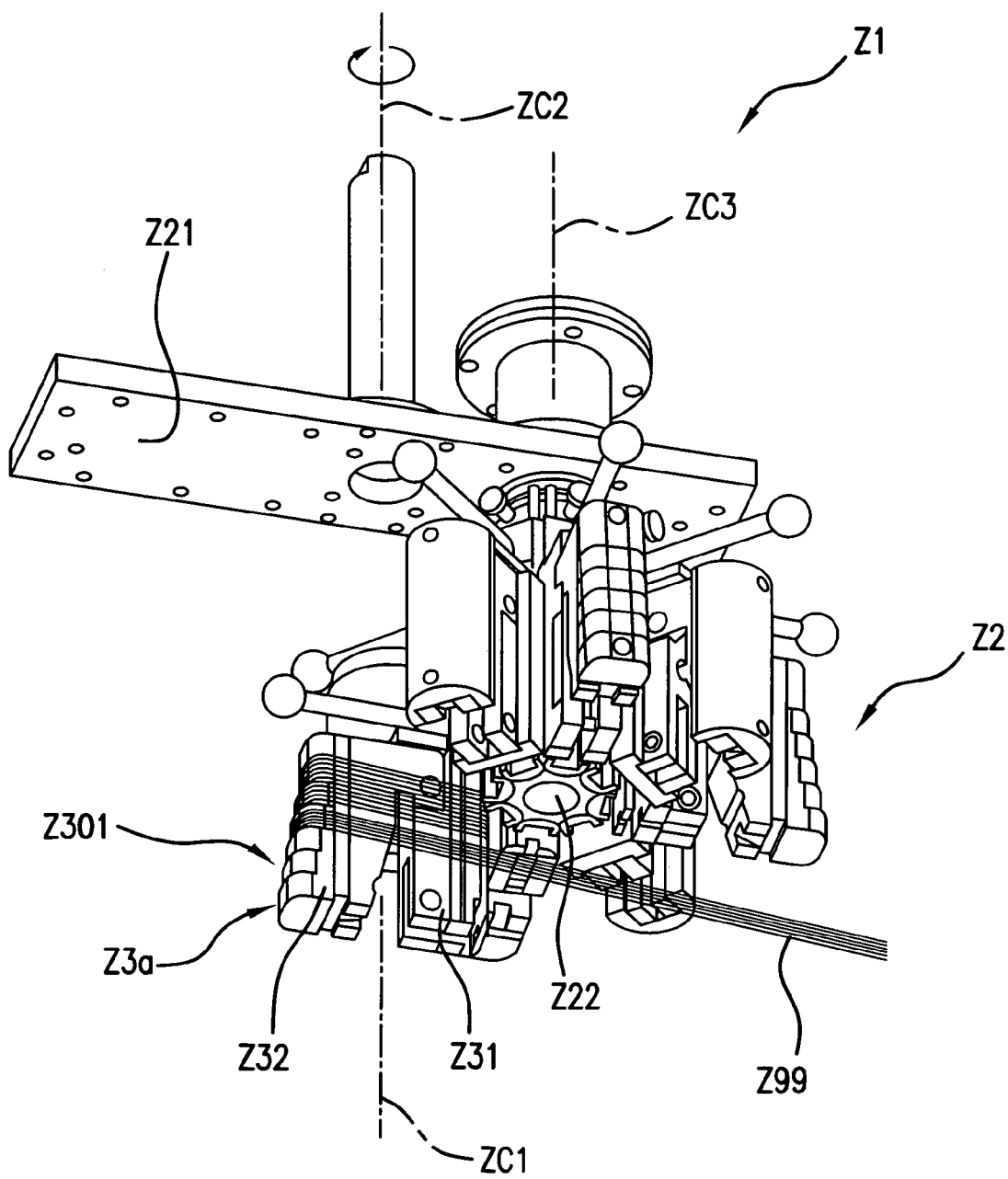
FIG. 30 is a perspective view of the coil forming apparatus of the fifth embodiment illustrating the first coil bobbin being wound with an electric wire to form a single-pole coil.

As shown in FIG. 30, on the other hand, in the winding step, the first coil bobbin Z3$a$ is fed with the electric wire Z99, and the swing arm Z21 is turned in the forward direction so that the first coil bobbin Z3$a$ is wound with a plurality of turns of the electric wire Z99 to thereby form the first single-pole coil Z90$a$. On the other hand, the outer bobbin portion Z32 of the first coil bobbin Z3$a$ assumes the aforementioned winding position Z301 so that the external diameter of the first coil bobbin Z3$a$ is stepwise enlarged in the forward direction. Thus, it is possible to form the single-pole coil Z90 having the winding diameter of the electric wire Z99 enlarged in the forward direction.

Figure 31:
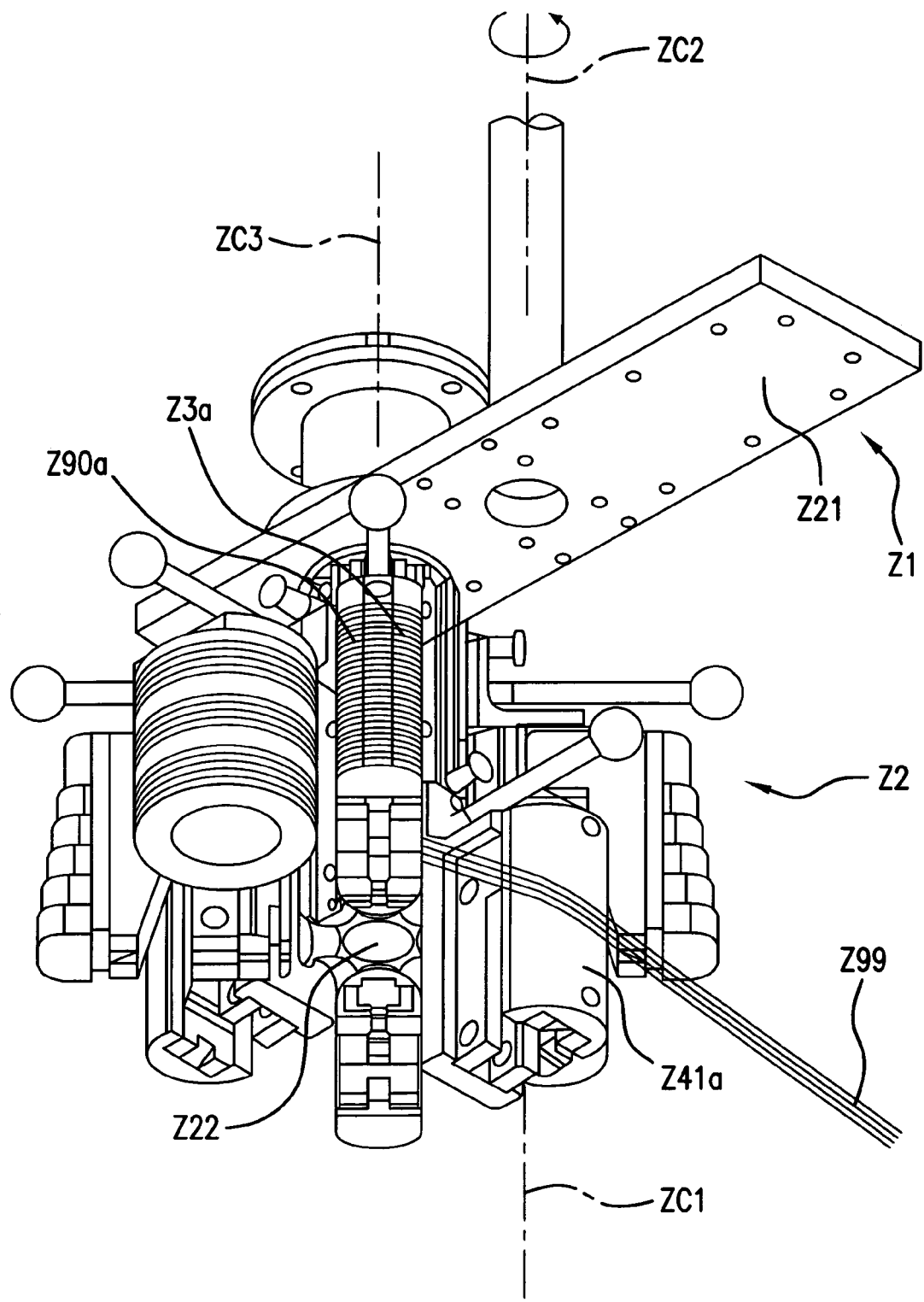
FIG. 31 is a perspective view of the coil forming apparatus of the fifth embodiment with a first crossover bobbin having its winding axis substantially aligned with the center swing axis of the swing arm and extended farther than the other bobbins for being wound with the electric wire.

Next, as shown in FIG. 31, indexing is performed by rotating the index holder Z22 through a predetermined angle to bring the winding axis ZC1 of a first crossover bobbin Z41$a$ into substantial alignment with the center swing axis ZC2. In the advancing step, the first crossover bobbin 42$a$ is advanced to extend beyond the other bobbins, and the first coil bobbin Z3$a$ is retracted.

Next, in forming the crossover wire, the first crossover bobbin Z41$a$ is fed with the electric wire Z99, and the swing arm Z21 is turned in reverse so that the first crossover bobbin Z41$a$ is wound with the electric wire Z99 to form the crossover wire Z995.

Figure 32:
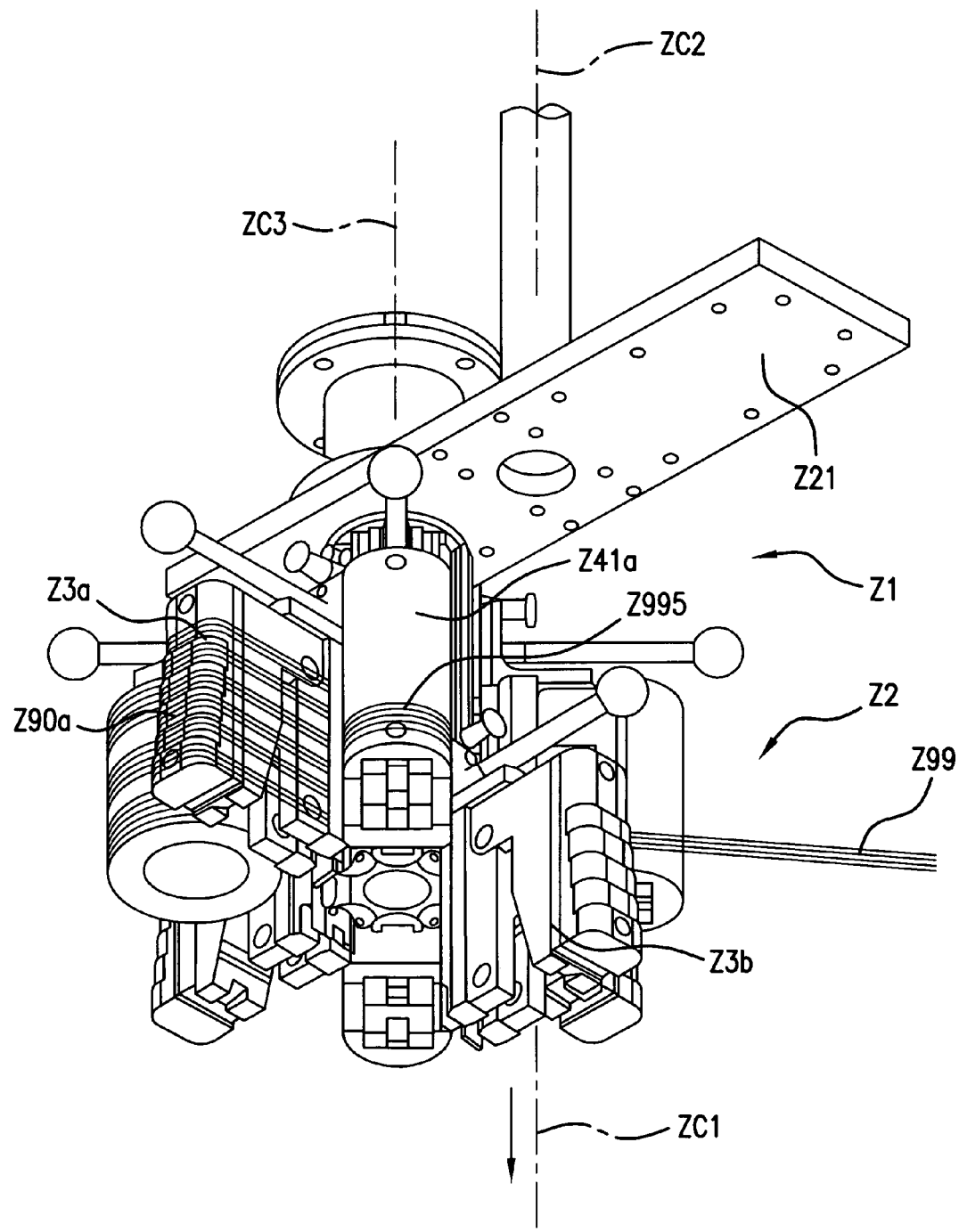
FIG. 32 is a perspective view of the coil forming apparatus of the fifth embodiment with a second coil bobbin having its winding axis substantially aligned with the center swing axis of a swing arm and extended farther than the other bobbins.

Next, as shown in FIG. 32, the aforementioned indexing is again performed to rotate the index holder Z22 through a predetermined angle to bring the winding axis ZC1 of the second coil bobbin Z3$b$ into substantial alignment with the center swing axis ZC2. In the advancing step, moreover, the second coil bobbin Z3$b$ is advanced to extend outward beyond the other bobbins, and the first crossover bobbin Z41$a$ is retracted.

Figure 33:
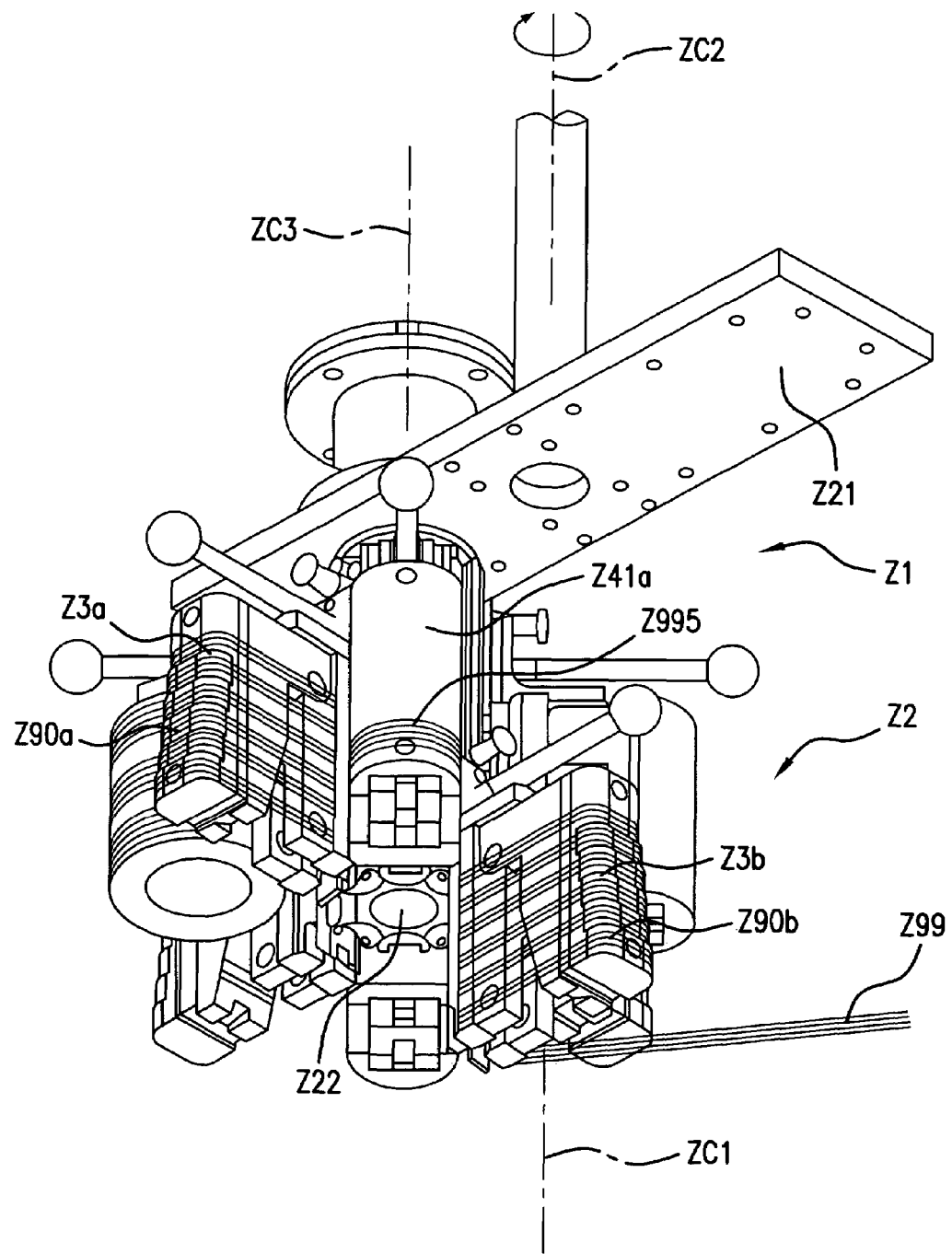
FIG. 33 is a perspective view of the coil forming apparatus of the fifth embodiment illustrating the second coil bobbin being wound with an electric wire to form a single-pole coil.

As shown in FIG. 33, the aforementioned winding step is again performed to feed the second coil bobbin Z3$b$ with the electric wire Z99, and the swing arm Z21 is turned in the forward direction so that the second coil bobbin Z3$b$ is wound with a plurality of turns of the electric wire Z99 to thereby form a second single-pole coil Z90$b$.

Figure 34:
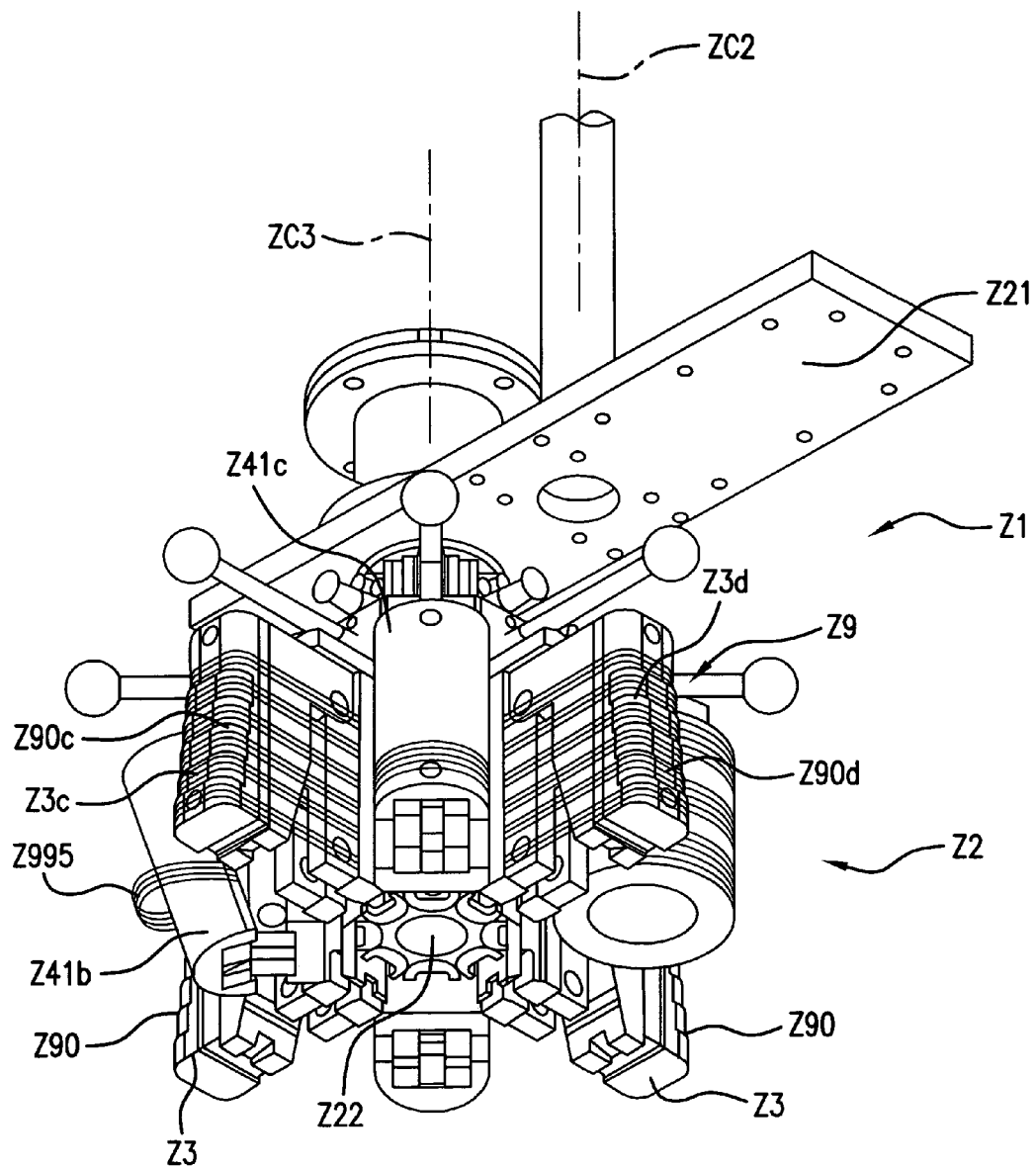
FIG. 34 is a perspective view of the coil forming apparatus of the fifth embodiment in which all the bobbins have been wound with the electric wire to form a continuous-pole coil.

As shown in FIG. 34, a second crossover bobbin Z41$b$ and a third crossover bobbin Z41$c$ are subjected to the aforementioned indexing step, an advancing step and a crossover wire forming step to thereby form the individual crossover wires Z995. A third coil bobbin Z3$c$ and the fourth coil bobbin Z3$d$ are also subjected to the indexing step, advancing step and winding steps to thereby form a third single-pole coil Z90c and a fourth single-pole coil Z90d.

Figure 35:
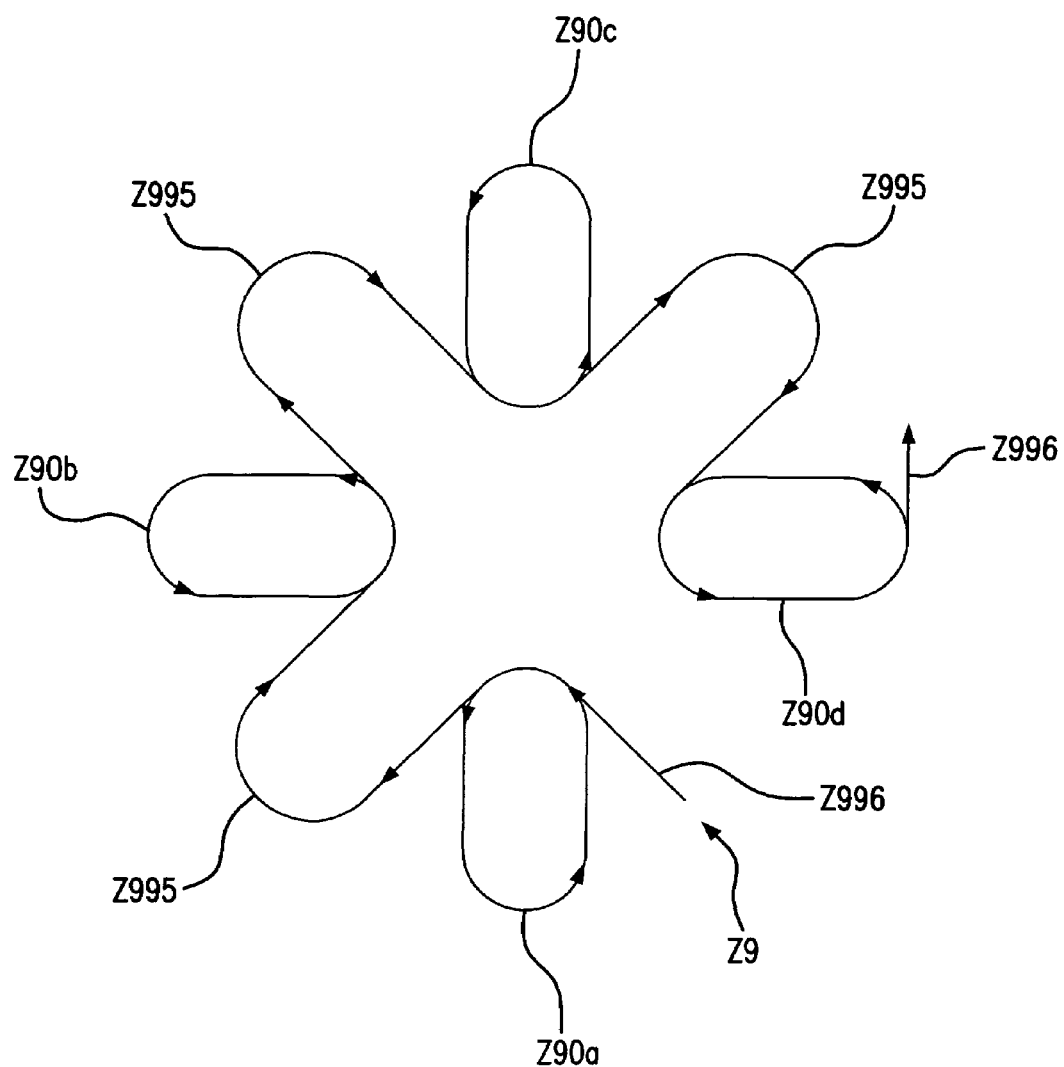
FIG. 35 is an explanatory view schematically showing the state wherein all the bobbins have been wound with the electric wire to form the continuous-pole coil.

Thus, the continuous-pole coil Z9 is formed with first to fourth single-pole coils Z90a to Z90d connected by the individual crossover wires Z995, as shown in FIG. 35. This treatment of the crossover wires Z995 is performed without gripping the electric wire with an external device, using only the winding jig Z2. The coils are wound around and restricted by the individual bobbins Z3a to Z3d, Z41a to Z41d and Z42 until all the poles are formed. FIG. 35 is a diagram schematically showing the state in which the individual single-pole coils Z90a to Z90d are formed around the first to fourth coil bobbins Z3a to Z3d, and in which the continuous-pole coil Z9 is formed of the individual bobbins Z3a to Z3d, Z41a to Z41d and Z42. As seen with reference to FIG. 35 and FIG. 26, the individual bobbins Z3a to Z3d, Z41a to Z41d and Z42 are arranged such that the virtual line joining their centers of gravity is generally circular. Therefore, the crossover wires are formed within the area contained by the individual coil bobbins Z3a to Z3d, namely, within the circle defined by the individual coil bobbins Z3a to Z3d circumferentially adjacent to each other at like diametrical positions with respect to the index holder Z22 of the winding jig Z2.

In this embodiment, like Embodiment 1, the winding jig Z2 is used to wind the electric wire 99 on any coil bobbin Z3 extended farther than the other coil bobbins Z3, as shown in FIG. 25.

As shown in FIG. 26, on the other hand, the individual coil bobbins Z3 are so arranged with respect to the index holder Z22 that a virtual line ZR joining their individual winding axes ZC1 is generally circular. Moreover, the bobbins Z3 are so arranged on the index holder Z22 that their individual winding axes ZC1 are substantially parallel to each other.

In this embodiment, like the first embodiment, the coil bobbin Z3 for winding is fed with the electric wire Z99, and the while winding jig Z2 is turned either around the winding axis ZC1 of the coil bobbin Z3 or around a line substantially parallel to the winding axis ZC1, to wind the electric wire Z99 on the coil bobbin Z3 extended farther than the remaining bobbins Z3, to thereby form the single-pole coils Z90 and a continuous-pole coil Z9 as the motor coil 9. Alternatively, the winding of the electric wire Z99 could be performed by bringing the winding axis ZC1 of the coil bobbin Z3 to be wound with the electric wire Z99, sequentially closer to the center swing axis ZC2 as the turning center of the winding jig Z2.

In the coil forming apparatus Z1, the coil bobbins Z3 are all swung together by the swing arm Z21 so that the coil bobbin Z3 brought the closest to the center swing axis ZC2 is wound with the electric wire Z99 to thereby form the single-pole coil Z90.

By turning the swing arm Z21, moreover, the index holder Z22 and the coil bobbins Z3 carried on the swing arm Z21 are all rotated together to wind the electric wire Z99. As a result, unlike the prior art in which the electric wire Z99 is wound while the winder or the like is being rotated around the outer circumference of the fixed bobbin, the single-pole coil Z90 can be formed on the bobbin Z3 substantially without twisting the electric wire 99.

By rotating the index holder, the winding axes ZC1 of the coil bobbins Z3 can be sequentially brought into substantial alignment with the center swing axis ZC2 of the swing arm Z21. Although the coil forming apparatus Z1 is provided with a plurality of coil bobbins Z3 for forming the continuous-pole coil Z9, therefore, the electric wire Z99 can be wound on a coil bobbin Z3 which is not significantly offset from the center swing axis ZC2.

After the single-pole coil Z90 has been was formed on any coil bobbin Z3, the index holder Z22 can be rotated to form the single-pole coil Z90 as before with the winding axis ZC1 of the next adjacent coil bobbin Z3 substantially aligned with the center swing axis ZC2.

As a result, the feed of the electric wire Z99 can be maintained substantially in a predetermined direction perpendicular to the winding axis ZC1 of the coil bobbin Z3 for the winding operation, so that the electric wire Z99 can be stably wound on each coil bobbin Z3 with little twist.

Embodiment 6

Figure 37:
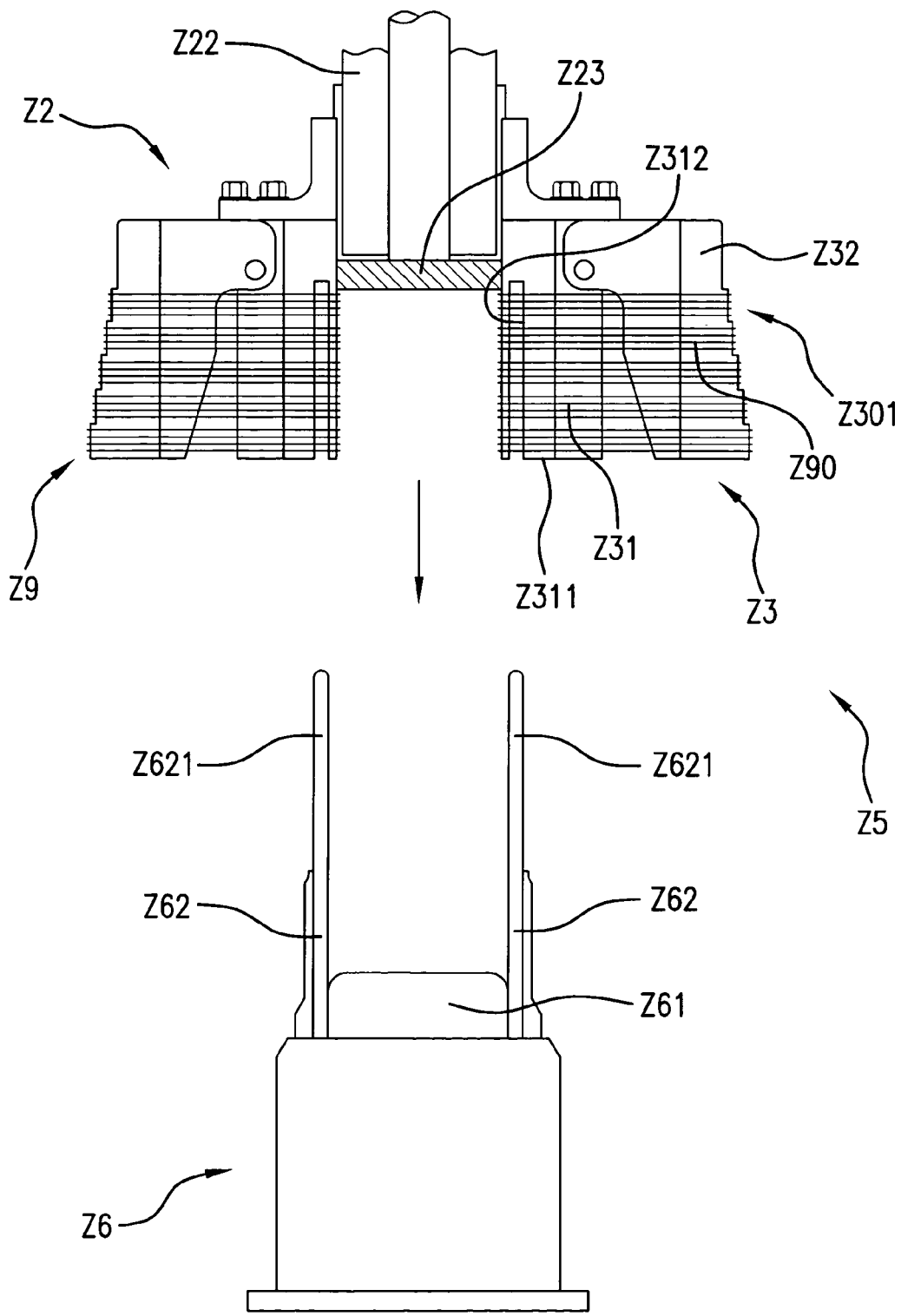
FIG. 37 is a schematic view of the coil forming/inserting apparatus of the sixth embodiment illustrating movement of the winding jig holding the continuous-pole coil forward to the inserter jig.

As shown in FIG. 37, the coil forming/inserting apparatus Z5 of this embodiment includes the winding jig Z2 for forming a continuous-pole coil Z9 in the form of single-pole coils Z90 wound with loops of the electric wire Z99 and inserter jig Z6 confronting the winding jig Z2 for accepting the continuous-pole coil Z9 and inserting and arranging the continuous-pole coil Z9 in the slots Z810 formed in the inner peripheral surface of the stator core Z81.

Figure 36:
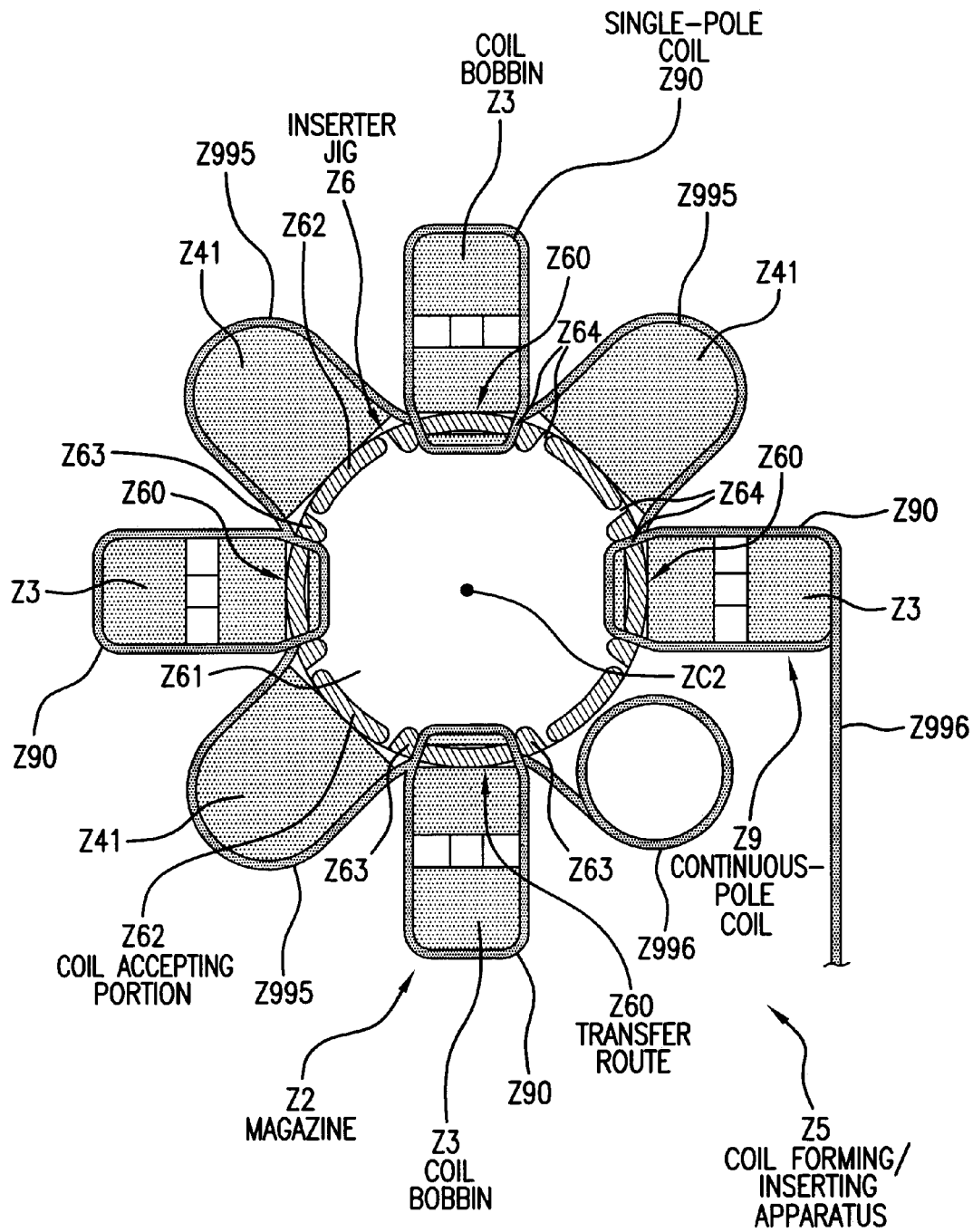
FIG. 36 is a schematic top plan view showing a coil forming/inserting apparatus of a sixth embodiment illustrating transfer of a continuous-pole coil from a winding jig to an inserter jig.

As shown in FIG. 36, the winding jig Z2 is provided with a plurality of coil bobbins Z3, and the inserter jig Z6 is provided with a plurality of coil accepting portions Z62 for accepting the individual single-pole coils Z90 from the individual coil bobbins Z3.

As shown in FIG. 25 and FIG. 26, the coil bobbins Z3 for winding the electric wire Z99 to form the single-pole coils Z90 are arranged at substantially equal distances from the center point of the winding jig Z2. In this winding jig Z2, moreover, the individual winding axes ZC1 of the coil bobbins Z3 are arranged substantially parallel to each other.

As shown in FIG. 36 and FIG. 37, on the other hand, the inserter jig Z6 is provided with a push/insertion core Z61 for pushing and inserting the continuous-pole coil Z9 into the slots Z810 of the stator core Z81. Moreover, the coil accepting portion Z62 is arranged on the outer circumference of the push/insertion core Z61 for accepting the individual single-pole coils Z90 from the individual coil bobbins Z3.

Figure 38:
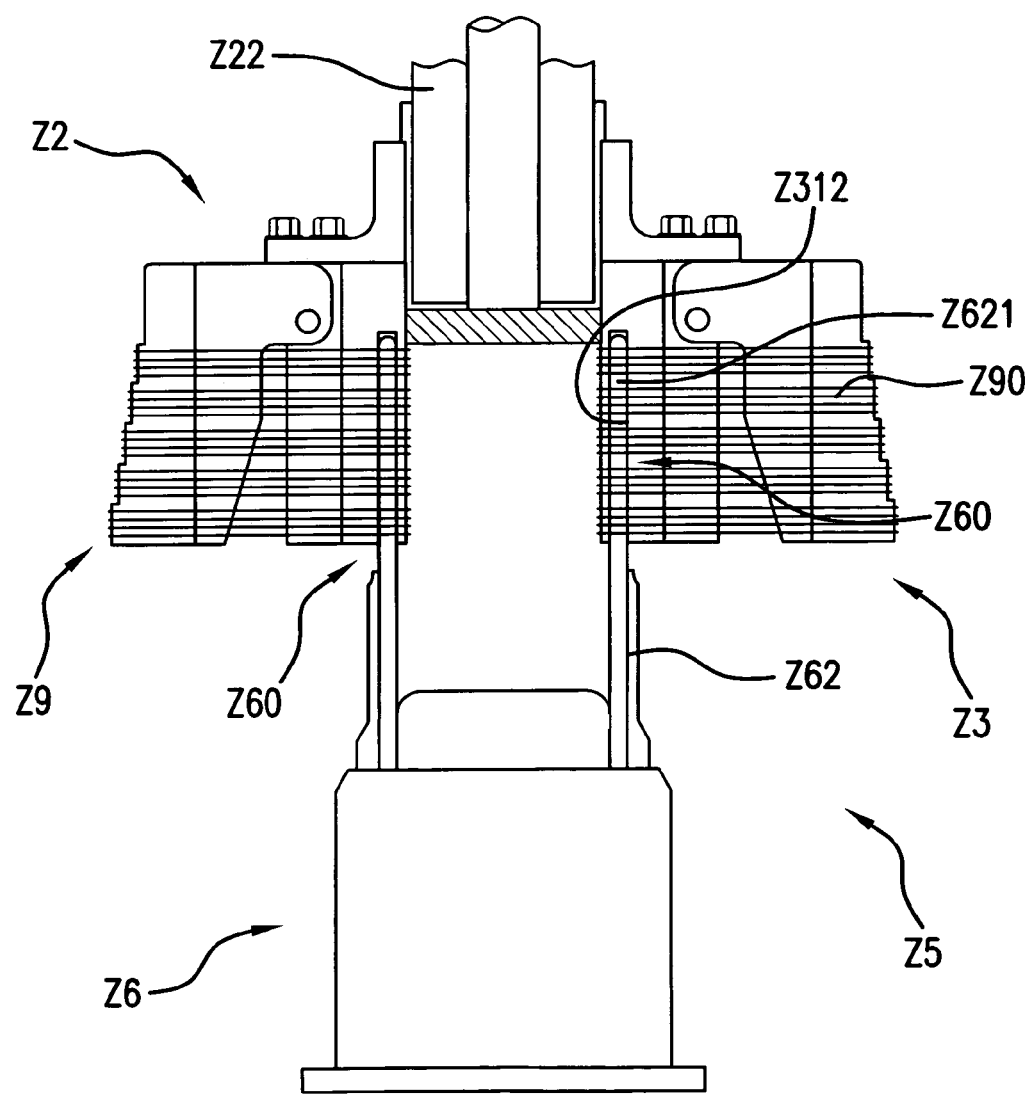
FIG. 38 is a schematic view of the coil forming/inserting apparatus of the sixth embodiment showing the distal end of the coil accepting portion of the inserter jig fitted in a fitting recess of the coil bobbin of the winding jig.

In the coil forming/inserting device Z5, as shown in FIG. 36 and FIG. 38, each coil accepting portion Z62 is positioned to confront a distal end face Z311 of a coil bobbin Z3 in the direction of the winding axis ZC1, when the continuous-pole coil Z9 is to be transferred from the winding jig Z2 to the inserter jig Z6. The coil bobbin Z3 and the coil accepting portion Z62 are connected to form a transfer route Z60 for transferring each single-pole coil Z90.

As shown in FIG. 27 and FIG. 36, each coil bobbin Z3 is provided in its distal end face Z311 with a fitting recess Z312 for receiving the distal end Z621 of a coil accepting portion Z62 of the inserter jig Z6. In this embodiment, the fitting recess Z312 is formed in the distal end face Z311 of the inner bobbin portion Z31 of each coil bobbin Z3.

As shown in FIG. 38, moreover, the fitting recess Z312 is made sufficiently deep to allow for insertion and arrangement of the coil accepting portion Z62 within the entirety of the loops of the single-pole coil Z90 wound around the coil bobbin Z3. Specifically, the fitting recess Z312 is made deeper from the distal end face Z311 of each coil bobbin Z3 than the winding width from the distal end face Z311 of each coil bobbin Z3 of the electric wire Z99.

As shown in FIG. 36 and FIG. 38, the connection between a coil bobbin Z3 and a coil accepting portion Z62 can be made by fitting the distal end portion Z621 of a coil accepting portion Z62 within the fitting recess Z312 of a coil bobbin Z3. The transfer of the continuous-pole coil Z9 from the winding jig Z2 to the inserter jig Z6 can be effected in that connected state. When this connection is completed, the distal end portion Z621 of each coil accepting portion Z62 is necessarily inserted within the loops of a single-pole coil Z90 on a coil bobbin Z3.

Figure 40:
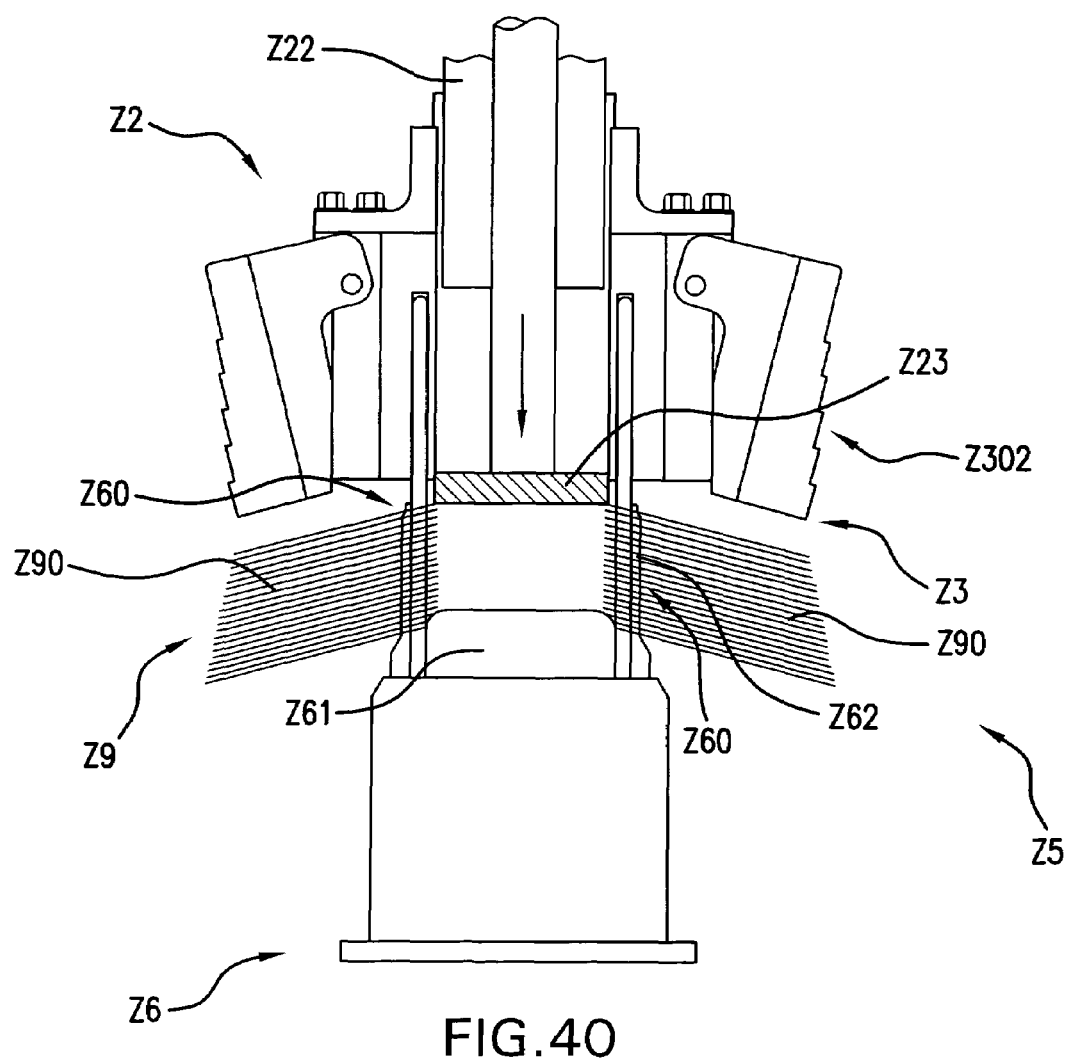
FIG. 40 is a schematic view of the coil forming/inserting apparatus of the sixth embodiment with a push-out core of the winding jig moved forward to push the continuous-pole coil to a regulating position in the inserter jig.

As shown in FIG. 36 and FIG. 37, the winding jig Z2 is provided with a push-out core Z23, which is axially arranged in each coil bobbin Z3 for movement forward and backward to push the continuous-pole coil Z9 onto the inserter jig Z6. This push-out core Z23 can push out, when moved forward (i.e., in the forward direction away from the swing arm Z21) toward the inserter jig Z6. Each single-pole coil Z90 is thereby transferred onto a coil accepting portion Z62, at a predetermined position on the inserter jig Z6, as shown in FIG. 40.

Figure 42:
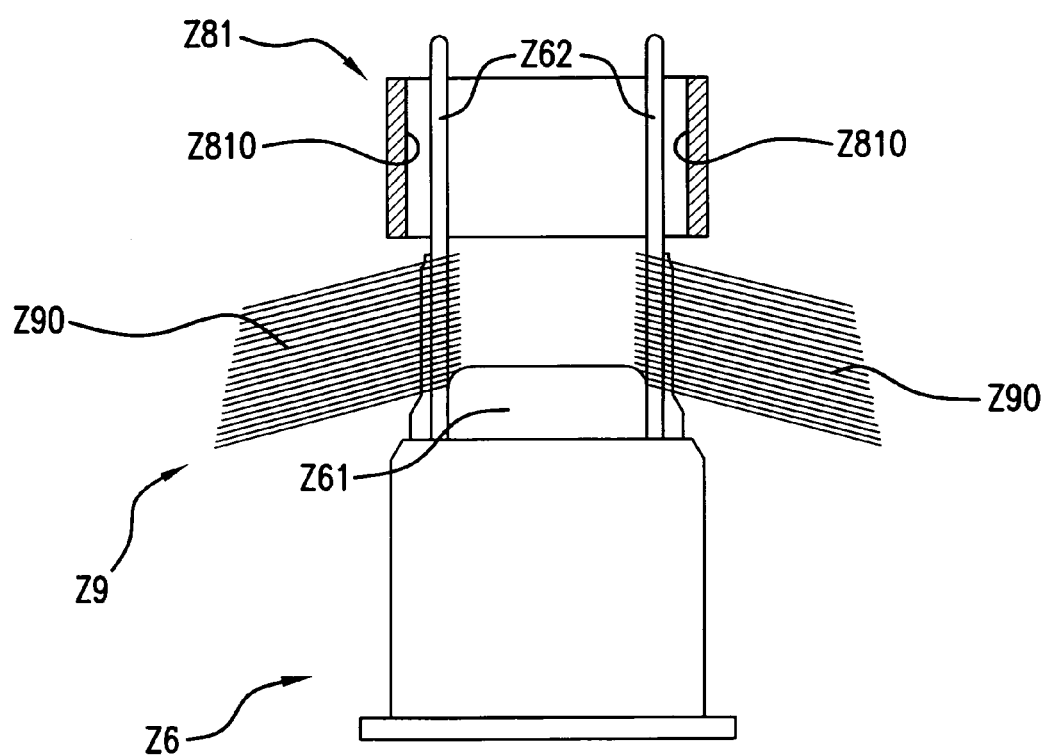
FIG. 42 is a schematic view of the coil forming/inserting apparatus of the sixth embodiment showing coil accepting portions of the inserter jig confronting the inner circumference of a stator core.

In this embodiment, as shown in FIG. 42, the predetermined position determines the position of the continuous-pole coil Z9 when this continuous-pole coil Z9 is inserted and arranged in the slots Z810 of the stator core Z81 by the inserter jig Z6. After the continuous-pole coil Z9 has been transferred to the inserter jig Z6, therefore, it can be inserted as is into the slots Z810 of the stator core Z81.

Figure 43:
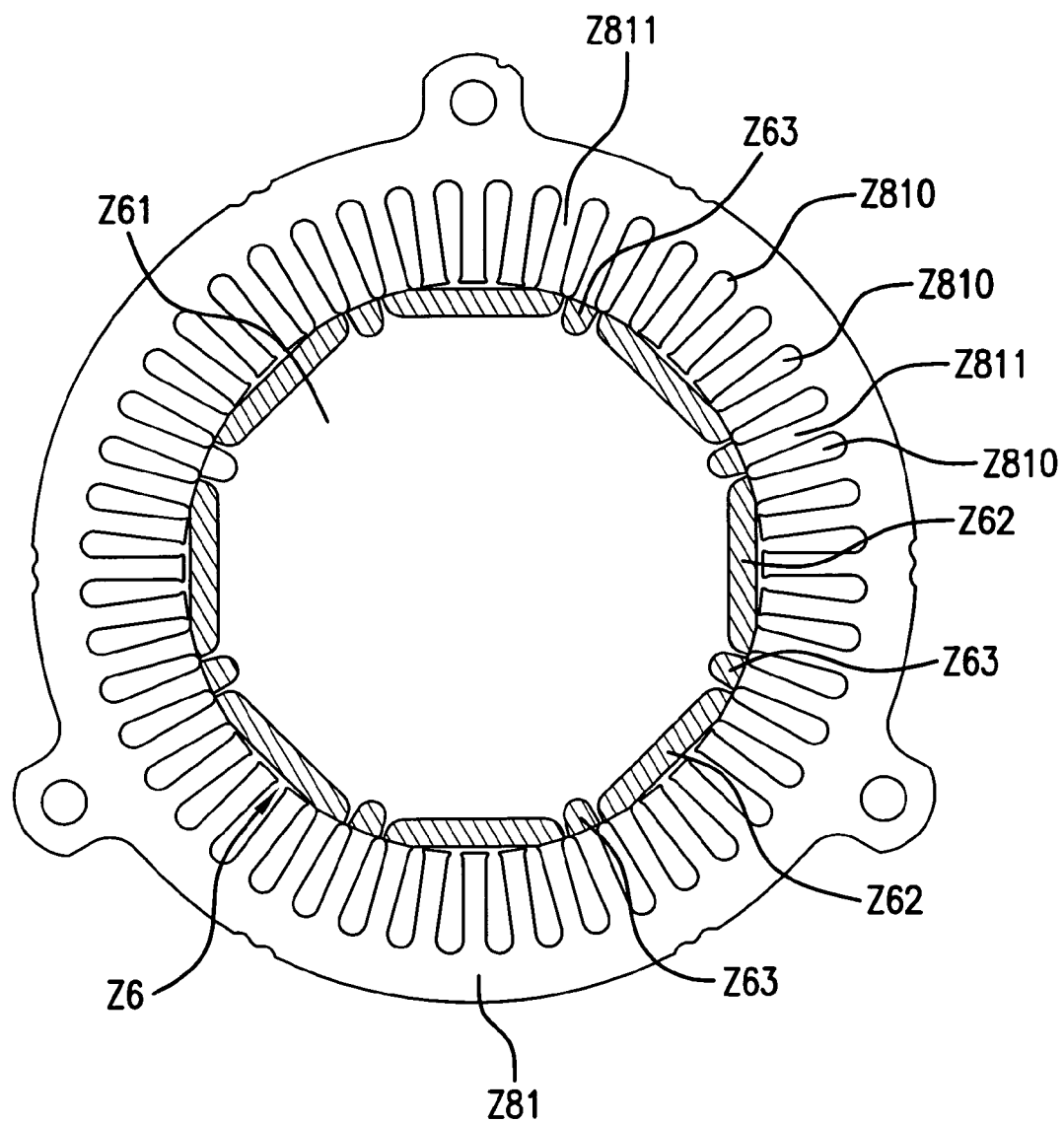
FIG. 43 is a top plan view of the coil forming/inserting apparatus of the sixth embodiment showing the individual coil accepting portions and the individual guides of the inserter jig confronting the inner circumference of the stator core.

As shown in FIG. 36, the inserter jig Z6 is provided with a plurality of guides Z63, which are arranged between the individual coil accepting portions Z62 and orientated substantially in the same direction as the forming direction of the coil accepting portions Z62. As shown in FIG. 43, those guides Z63 confront teeth Z811 positioned between the individual slots Z810 of the stator core Z81 to thereby guide the insertion of the continuous-pole coil Z9 into the individual slots Z810.

Between each guide Z63 and the coil accepting portions Z62 adjacent the two sides of the guide Z63, as shown in FIG. 36, are provided insertion clearances Z64, into which the electric wires Z99 of the individual single-pole coils Z90 are inserted. Each single-pole coil Z90 is prevented, when its electric wire Z99 is inserted into the insertion clearances Z64 from becoming interlaced with the electric wire Z99 of the adjoining single-pole coil Z90. As a result, the electric wire Z99 of each single-pole coil Z90 can be reliably inserted and arranged in the slots Z810 of the stator core Z81.

Figure 44:
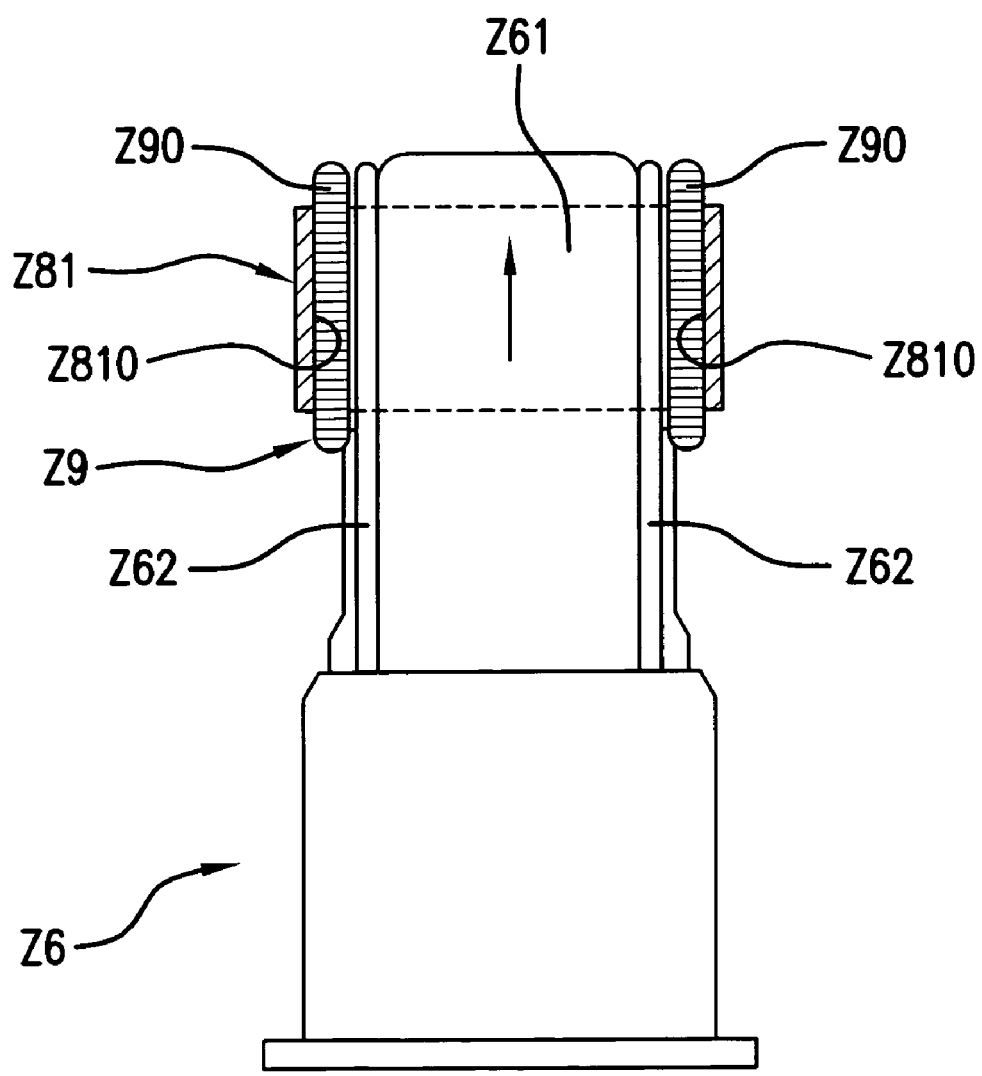
FIG. 44 is a top plan view of the coil forming/inserting apparatus of the sixth embodiment showing the continuous-pole coil inserted from the inserter jig into the individual slots of the stator core.

As shown in FIG. 44, the push/insertion core Z61 can move toward and away from the individual coil receiving portions Z62. When the coil portions Z62 and the guides Z63 are brought into alignment the inner circumference of the stator core Z81, the push/insertion core Z61 moves forward toward the stator core Z81 so that the single-pole coils Z90 held on the coil receiving portions Z62 are inserted into the slots Z810.

Here will be described the coil forming/inserting method, which performs the coil transfer step of transferring the continuous-pole coil Z9 formed at the coil forming step explained in Embodiment 5, first to the inserter jig Z6; and the coil inserting step of inserting and arranging the continuous-pole coil Z9 from the inserter jig Z6 in the individual slots Z810 of the stator core Z81.

In this embodiment, the coil forming step is similar to that of the fifth embodiment.

In the step of transferring, as shown in FIG. 36, the continuous-pole coil Z9 is transferred from the winding jig Z2 to the inserter jig Z6 using the coil forming/inserting apparatus Z5.

In the coil transfer step, as shown in FIG. 37, the winding jig Z2 having the continuous-pole coil Z9 formed therein is first moved forward to the inserter jig Z6. At this time, each outer bobbin portion Z32 is in its winding position Z301 so that each single-pole coil Z90 is under tension.

As shown in FIG. 38, the distal end Z621 of each coil receiving portion Z62 of the inserter jig Z6 is fitted in a fitting recess Z312 of a coil bobbin Z3. By this operation, each coil bobbin Z3 and coil receiving portion Z62 are connected to form a transfer route Z60 for transferring a single-pole coil Z90. In this fitting operation, the distal end Z621 of each coil receiving portion Z62 is inserted through all loops of each single-pole coil Z90 in each coil bobbin Z3.

Figure 39:
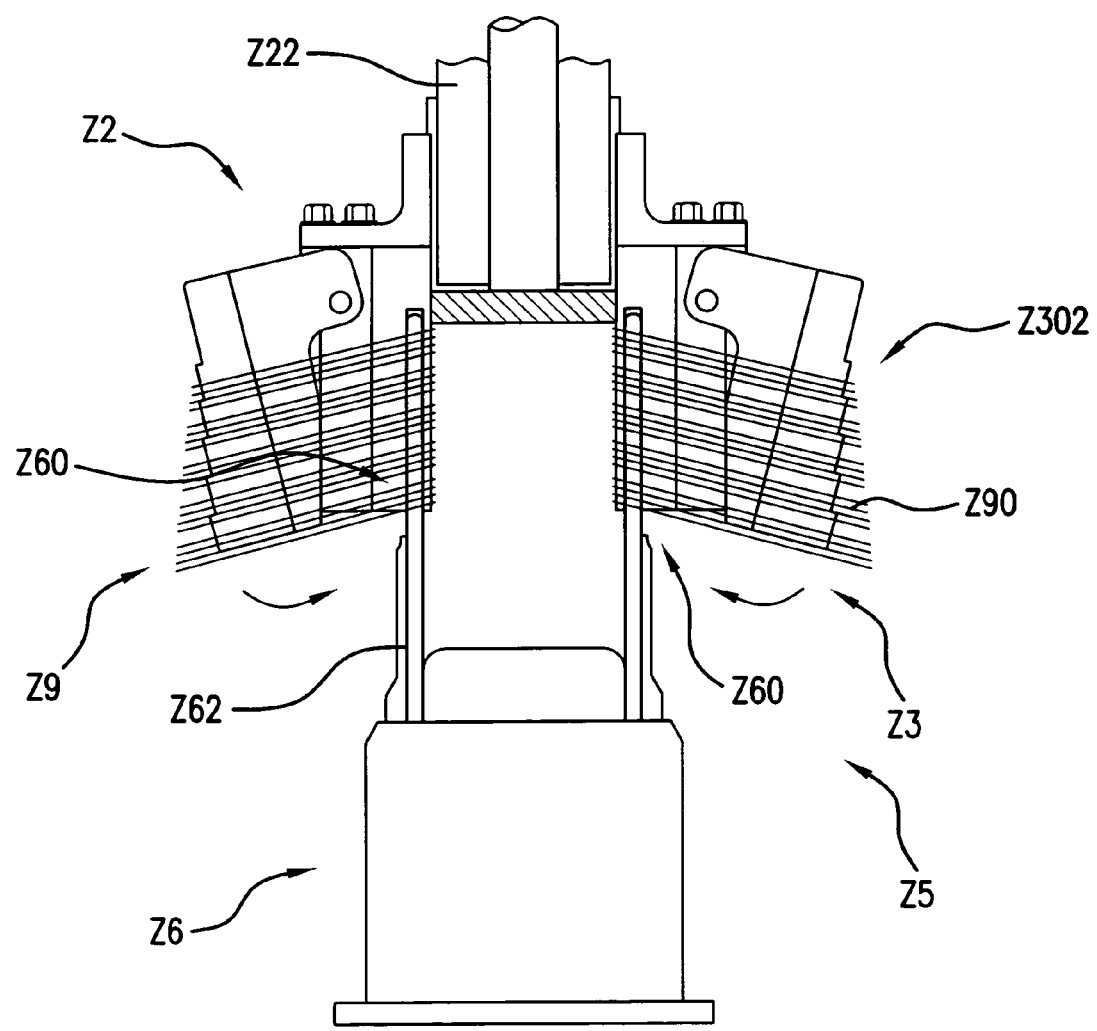
FIG. 39 is a schematic view of the coil forming/inserting apparatus of the sixth embodiment showing the outer bobbin portion of each coil bobbin of the winding jig moved to a releasing position to release the single-pole coil from the coil bobbin.

Next, for releasing, as shown in FIG. 39, the outer bobbin portion Z32 of each coil bobbin Z3 is moved to the aforementioned releasing position Z302. In this manner, the diameter of the coil bobbin Z3 is reduced in the forward direction. As a result, the single-pole coil Z90 is released from the coil bobbin Z3.

Next, the push-out core Z23 of the winding jig Z2 is moved forward to the inserter jig Z6, as shown in FIG. 40. At this time, the individual single-pole coils Z90 wound around the outer circumferences of the individual coil bobbins Z3 are pushed out altogether to the aforementioned regulating positions, at which they abut against the push/insertion cores Z61 of the inserter jigs Z6.

With the transfer routes Z60 established, all the single-pole coils Z90 can be simultaneously transferred together with the crossover wires from the individual coil bobbins Z3 to the individual coil accepting portions Z62.

Figure 41:
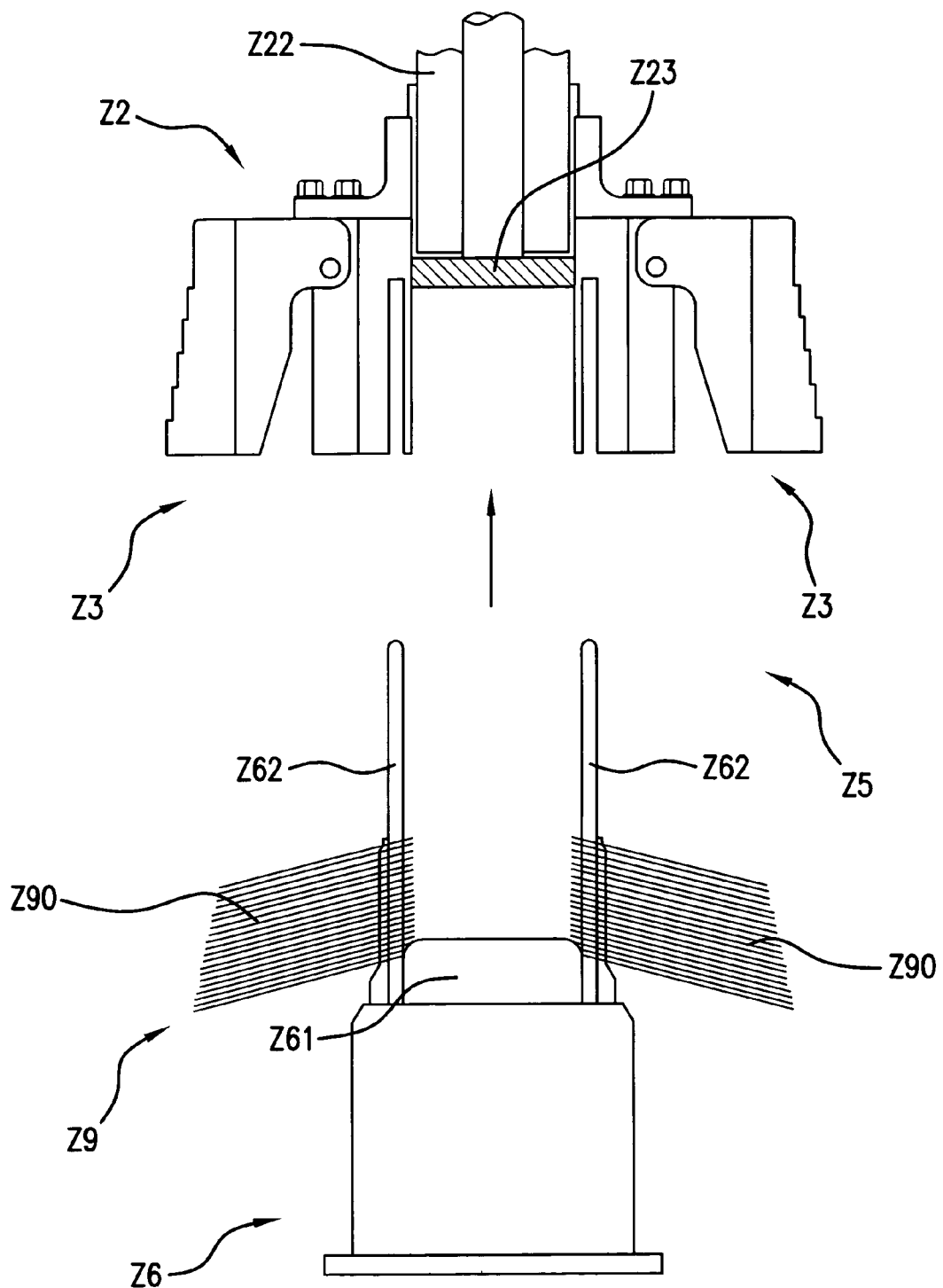
FIG. 41 is a schematic view of the coil forming/inserting apparatus of the sixth embodiment with the winding jig withdrawn from the inserter jig.

After this, the winding jig Z2 is moved away from the inserter jig Z6, as shown in FIG. 41, so that the transfer of the continuous-pole coil Z9, having the joined single-pole coils Z90, to the inserter jig Z6 is completed.

In the coil inserting step, as shown in FIG. 42 to FIG. 44, the continuous-pole coil Z9 retained in the inserter jig Z6 is inserted into the slots Z810 formed in the inner circumferential surface of the stator core Z81. More specifically, as shown in FIG. 42 and FIG. 43, the individual coil accepting portions Z62 of the inserter jig Z6 are first arranged to confront the inner circumferential surface of the stator core Z81 and the individual guides Z63 are arranged to confront the individual teeth Z811 between the individual slots Z810.

Next, the push/insertion core Z61 is moved forward toward the stator core Z81, as shown in FIG. 44. In this manner, the electric wires Z99 in the individual single-pole coils Z90 retained in the coil receiving portions Z62 are inserted into the individual slots Z810. As the distal end of the push/insertion core Z61 moves forward beyond the distal ends of the coil accepting portions Z62, the single-pole coils Z90 are inserted and arranged in the slots Z810 so that the continuous-pole coil Z9 is assembled within the stator core Z81.

Thus, the fifth and sixth embodiments manufacture a stator for a three-phase motor composed of U-, V- and W-phases. In this embodiment, the winding jig Z2 has four coil bobbins Z3 and the three crossover bobbins Z41, and the inserter jig Z6 has eight coil accepting portions Z62 and the eight guides Z63. The four-pole coil is formed, as the continuous-pole coil Z9 having the four single-pole coils Z90, on the winding jig Z2 and is transferred to the inserter jig Z6. Then, the two four-pole coils are assembled, using the inserter jig Z6, within the stator core Z81 to thereby form the U-phase as an eight-pole coil composed of two four-pole coils. For the V-phase and the W-phase, that assembly is again in the form of an eight-pole coil having two four-pole coils.

Because the individual single-pole coils Z90 are formed around the individual coil bobbins Z3 having their relative positions fixed, the lengths of the crossover wires Z995 formed between the single-pole coils Z90 are also constant.

The individual single-pole coils Z90 can be received substantially simultaneously by the coil receiving portions Z62. Therefore, the individual single-pole coils Z90 having their winding diameters enlarged from one side to the other side are not changed in their winding order when they are transferred to the inserter jig Z6, so that they can be transferred with the electric wires Z99 being arrayed without change in the winding order.

The invention claimed is:

1. A method for forming a motor coil having a plurality of connected single-pole coils wound with loops of an electric wire, said method comprising:
   (a) providing a winding jig including a plurality of bobbins, the bobbins having respective central winding axes offset from each other so that they are not aligned;
   (b) winding a first of said bobbins with the electric wire by feeding it with the electric wire while turning the whole winding jig either around the winding axis of the bobbin or around a line generally parallel to the winding axis, to thereby form a single-pole coil; and
   repeating step (b) to form a single-pole coil around each of the other bobbins, in succession, thus completing the motor coil.

2. The coil forming method in claim 1, further comprising:
   moving the bobbins, individually and in succession, radially outward from the center of the winding jig so as to protrude farther than the remaining bobbins and wherein said winding is on the protruding bobbin.

3. The coil forming method of claim 2, further comprising:
   indexing the winding jig to sequentially bring the winding axes of the bobbins close to alignment with a rotational center axis of the winding jig.

4. The coil forming method of claim 3, wherein the winding jig further includes a base holder and wherein the plurality of bobbins are mounted around an outer circumference of the base holder for movement relative to the base holder, said method further comprising:
   extending bobbins, in sequence, away from the base holder to protrude farther than the remaining bobbins, wherein the winding of step (b) is on the protruded bobbin, and wherein the feeding of the electric wire is generally in one direction.

5. A coil forming method in claim 4 wherein said extending is followed by retracting the protruding bobbin after completion of said winding, said extending and said retracting being generally linear, along with winding axis of the bobbin.

6. The coil forming method of claim 5 wherein the direction of turning of said winding jig is reversed for each successive winding step (b).

7. The coil forming method of claim 3 wherein the direction of turning of said winding jig is reversed for each successive winding step (b).

8. The coil forming method of claim 1, further comprising:
   indexing the winding jig to sequentially bring the winding axes of the bobbins close to alignment with a rotational center axis of the winding jig.

9. The coil forming method of claim 1, wherein the winding jig further includes a base holder and wherein the plurality of bobbins are mounted around an outer circumference of the base holder for movement relative to the base holder, said method further comprising:
   extending bobbins, in sequence, away from the base holder to protrude farther than the remaining bobbins, wherein the winding of step (b) is on the protruded bobbin, and wherein the feeding of the electric wire is generally in one direction.

10. A coil forming method in claim 9 wherein said extending is followed by retracting the protruding bobbin after completion of said winding, said extending and said retracting being generally linear, along with winding axis of the bobbin.

11. The coil forming method of claim 9 further comprising:
   after completion of said winding step (b) retracting the protruding bobbin having said single-pole coil wound thereon by reversing the direction of winding.

12. The coil forming method of claim 1 wherein the direction of turning of said winding jig is reversed for each successive winding step (b).

13. An apparatus for forming a motor coil having a plurality of connected single-pole coils of wound electric wire comprising:
   a winding jig including a plurality of bobbins, said bobbins having respective central winding axes offset from each other so that they are not aligned;
   bobbins having a central winding axis; and
   turning means for turning said winding jig as a whole around a center swing axis aligned with either the winding axis of any one of said bobbins or a line generally parallel to the winding axis.

14. The coil forming apparatus of claim 13, further comprising:
   means for extending any one of said bobbins such that it protrudes farther than the remaining bobbins, for receiving the electric wire as the winding jig is turned.

15. The coil forming apparatus of claim 14, further comprising:
   indexing means for bringing the winding axis of a bobbin for winding into electric wire thereon close to alignment with the center swing axis of said winding jig.

16. The coil forming apparatus of claim 13, further comprising:
   indexing means for bringing the winding axis of a bobbin for winding into electric wire thereon close to alignment with the center swing axis of said winding jig.

17. The coil forming apparatus of claim 13 wherein said bobbins have respective centers of gravity arranged in a generally circular array.

18. The coil forming apparatus of claim 17 wherein the winding axes of said bobbins are arranged radially outward from the center of said circular array.

19. The coil forming apparatus of claim 17 wherein the winding axes of said bobbins are arranged generally in parallel with each other.

20. The coil forming apparatus of claim 13 wherein:
   said winding jig further includes a base holder and wherein the a plurality of bobbins is arranged around the outer circumference of said base holder and mounted for movement relative to said base holder between extended and retracted positions, so that any one of said bobbins may be positioned to protrude farther than the remaining bobbins for winding with the electric wire by said turning means.

21. The coil forming apparatus of claim 20 wherein said base holder has a disc shape; and wherein said bobbins are mounted for movement forward and backward along their respective winding axes, said winding axes extending radially from a center point of said base holder.

22. The coil forming apparatus of claim 20 wherein each of said bobbins has a sector shape which widens radially outward along its winding axis.

23. The coil forming apparatus of claim 20 further comprising shaping blocks removably attached to each of said bobbins to shape the single-pole coil.

24. The coil forming apparatus of claim 20 wherein, with all of said bobbins in their retracted positions, distal ends of said bobbins define a circle centered on said base holder.

25. The coil forming apparatus of claim 20 further comprising:
separation plates extending from the outer periphery of said base holder and ranged on both sides of each of said bobbins, with predetermined spacings between said separation plates and said bobbins.

26. The coil forming apparatus of claim 13 further comprising shaping blocks removably attached to each of said bobbins to shape the single-pole coil.

* * * * *

UNITED STATES PATENT AND TRADEMARK OFFICE
CERTIFICATE OF CORRECTION

PATENT NO. : 7,311,284 B2  Page 1 of 1
APPLICATION NO. : 10/497945
DATED : December 25, 2007
INVENTOR(S) : Shingo Hashimoto et al.

It is certified that error appears in the above-identified patent and that said Letters Patent is hereby corrected as shown below:

Title page, item [57] Abstract, line 5 "from center" should read -- from the center --.
Column 23, line 50 (claim 5, line 4), "along with" should read -- along the --.
Column 24, line 9 (claim 10, line 4), "along with" should read -- along the --.
Column 24, line 24 (claim 13, line 6), "aligned;" should read -- aligned; and --.
Column 24, line 25 delete "bobbins having a central winding axis; and".

Signed and Sealed this

Twenty-ninth Day of April, 2008

JON W. DUDAS
*Director of the United States Patent and Trademark Office*